United States Patent
Shen et al.

(10) Patent No.: US 9,596,126 B2
(45) Date of Patent: Mar. 14, 2017

(54) CONTROLLER SIDE METHOD OF GENERATING AND UPDATING A CONTROLLER ASSIGNMENT LIST

(71) Applicant: Nicira, Inc., Palo Alto, CA (US)

(72) Inventors: Jianjun Shen, Beijing (CN); Hua Wang, Beijing (CN); James Joseph Stabile, Los Altos, CA (US); Xuan Zhang, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 322 days.

(21) Appl. No.: 14/070,448

(22) Filed: Nov. 1, 2013

(65) Prior Publication Data

US 2015/0103645 A1 Apr. 16, 2015

Related U.S. Application Data

(60) Provisional application No. 61/889,519, filed on Oct. 10, 2013, provisional application No. 61/890,321, filed on Oct. 13, 2013.

(51) Int. Cl.
*H04L 12/24* (2006.01)
*H04L 12/803* (2013.01)
(Continued)

(52) U.S. Cl.
CPC .......... *H04L 41/042* (2013.01); *G06F 9/4445* (2013.01); *H04L 45/64* (2013.01);
(Continued)

(58) Field of Classification Search
CPC .......... H04L 49/00; H04L 49/15; H04L 49/70; H04L 41/042; H04L 41/0668; H04L 47/125
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |

(Continued)

FOREIGN PATENT DOCUMENTS

WO    WO 2013/184846    12/2013

OTHER PUBLICATIONS

Author Unknown, "Apache Cassandra™ 1.2 Documentation," Jan. 13, 2013, 201 pages, DataStax.
(Continued)

*Primary Examiner* — Awet Haile
(74) *Attorney, Agent, or Firm* — Adeli LLP

(57) ABSTRACT

Some embodiments provide a novel method for distributing control-channel communication load between multiple controllers in a network control system. In some embodiments, the controllers manage physical forwarding elements that forward data between several computing devices (also called hosts or host computers), some or all of which execute one or more virtual machines (VMs). The method of some embodiments distributes a controller assignment list to the host computers. The host computers use this list to identify the controllers with which they need to interact to perform some of the forwarding operations of their associated logical forwarding elements. In some embodiments, agents executing on the host computers (1) review the controller assignment list to identify the appropriate controllers, and (2) establish control channel communications with these controllers to obtain the needed data for effectuating the forwarding operations of their associated physical forwarding elements. These agents in some embodiments are responsible for out-of-band control channel communication with the controllers.

20 Claims, 22 Drawing Sheets

(51) Int. Cl.
*H04L 29/06* (2006.01)
*H04L 12/715* (2013.01)
*G06F 9/44* (2006.01)
*H04L 29/12* (2006.01)

(52) U.S. Cl.
CPC ............ *H04L 47/125* (2013.01); *H04L 67/38* (2013.01); *H04L 41/0659* (2013.01); *H04L 61/103* (2013.01); *H04L 61/2015* (2013.01)

(56) References Cited

U.S. PATENT DOCUMENTS

| | | | |
|---|---|---|---|
| 5,729,685 A | 3/1998 | Chatwani et al. | |
| 5,751,967 A | 5/1998 | Raab et al. | |
| 5,796,936 A | 8/1998 | Watabe et al. | |
| 6,104,699 A | 8/2000 | Holender et al. | |
| 6,219,699 B1 | 4/2001 | McCloghrie et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,941,487 B1 | 9/2005 | Balakrishnan et al. | |
| 6,963,585 B1 | 11/2005 | Le Pennec et al. | |
| 7,079,544 B2 | 7/2006 | Wakayama et al. | |
| 7,096,228 B2 | 8/2006 | Theimer et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,286,490 B2 | 10/2007 | Saleh et al. | |
| 7,359,971 B2 | 4/2008 | Jorgensen | |
| 7,450,598 B2 | 11/2008 | Chen et al. | |
| 7,483,370 B1 | 1/2009 | Dayal et al. | |
| 7,606,260 B2 | 10/2009 | Oguchi et al. | |
| 7,649,851 B2 | 1/2010 | Takashige et al. | |
| 7,710,874 B2 | 5/2010 | Balakrishnan et al. | |
| 7,730,486 B2 | 6/2010 | Herington | |
| 7,792,987 B1 | 9/2010 | Vohra et al. | |
| 7,818,452 B2 | 10/2010 | Matthews et al. | |
| 7,826,482 B1 | 11/2010 | Minei et al. | |
| 7,885,276 B1 | 2/2011 | Lin | |
| 7,937,438 B1 | 5/2011 | Miller et al. | |
| 7,948,986 B1 | 5/2011 | Ghosh et al. | |
| 8,027,354 B1 | 9/2011 | Portolani et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,166,201 B2 | 4/2012 | Richardson et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,312,129 B1 | 11/2012 | Miller et al. | |
| 8,456,984 B2 | 6/2013 | Ranganathan et al. | |
| 8,504,718 B2 | 8/2013 | Wang et al. | |
| 8,621,058 B2 | 12/2013 | Eswaran et al. | |
| 8,644,188 B1 | 2/2014 | Brandwine et al. | |
| 8,705,513 B2 | 4/2014 | Van Der Merwe et al. | |
| 9,021,098 B1 * | 4/2015 | Nagle .................... | H04L 61/20 709/226 |
| 2003/0093481 A1 | 5/2003 | Mitchell et al. | |
| 2004/0047286 A1 | 3/2004 | Larsen et al. | |
| 2004/0073659 A1 | 4/2004 | Rajsic et al. | |
| 2004/0098505 A1 | 5/2004 | Clemmensen | |
| 2004/0267897 A1 | 12/2004 | Hill et al. | |
| 2005/0018669 A1 | 1/2005 | Arndt et al. | |
| 2005/0038834 A1 | 2/2005 | Souder et al. | |
| 2005/0083953 A1 | 4/2005 | May | |
| 2005/0120160 A1 | 6/2005 | Plouffe et al. | |
| 2006/0002370 A1 | 1/2006 | Rabie et al. | |
| 2006/0026225 A1 | 2/2006 | Canali et al. | |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0184937 A1 | 8/2006 | Abels et al. | |
| 2006/0193266 A1 | 8/2006 | Siddha et al. | |
| 2007/0043860 A1 | 2/2007 | Pabari | |
| 2007/0156919 A1 | 7/2007 | Potti et al. | |
| 2007/0220059 A1 | 9/2007 | Lu et al. | |
| 2007/0220358 A1 | 9/2007 | Goodill et al. | |
| 2007/0260721 A1 | 11/2007 | Bose et al. | |
| 2007/0283348 A1 | 12/2007 | White | |
| 2007/0297428 A1 | 12/2007 | Bose et al. | |
| 2008/0002579 A1 | 1/2008 | Lindholm et al. | |
| 2008/0040467 A1 | 2/2008 | Mendiratta et al. | |
| 2008/0049621 A1 | 2/2008 | McGuire et al. | |
| 2008/0059556 A1 | 3/2008 | Greenspan et al. | |
| 2008/0071900 A1 | 3/2008 | Hecker et al. | |
| 2008/0159301 A1 | 7/2008 | de Heer | |
| 2008/0165704 A1 | 7/2008 | Marchetti et al. | |
| 2009/0296726 A1 | 12/2009 | Snively et al. | |
| 2010/0125667 A1 | 5/2010 | Soundararajan | |
| 2011/0103259 A1 | 5/2011 | Aybay et al. | |
| 2011/0296052 A1 | 12/2011 | Guo et al. | |
| 2012/0075991 A1 * | 3/2012 | Sugita .................... | G06F 9/505 370/235 |
| 2012/0120964 A1 | 5/2012 | Koponen et al. | |
| 2012/0147894 A1 | 6/2012 | Mulligan et al. | |
| 2013/0024579 A1 | 1/2013 | Zhang et al. | |
| 2013/0044752 A1 | 2/2013 | Koponen et al. | |
| 2013/0103817 A1 * | 4/2013 | Koponen ............ | G06F 9/45558 709/223 |
| 2013/0332602 A1 | 12/2013 | Nakil et al. | |
| 2013/0332619 A1 | 12/2013 | Xie et al. | |
| 2014/0181829 A1 | 6/2014 | Hathaway et al. | |
| 2015/0103661 A1 | 4/2015 | Shen et al. | |

OTHER PUBLICATIONS

Author Unknown, "Virtual Machine Backup Guide," Nov. 2007, 78 pages, VMware, Inc., Palo Alto, California.
Portions of prosecution history of U.S. Appl. No. 14/070,451, filed Mar. 24, 2016, Shen, Jianjun, et al.

* cited by examiner

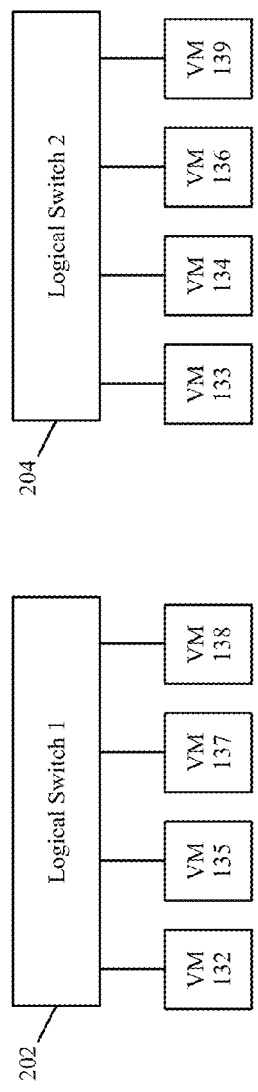
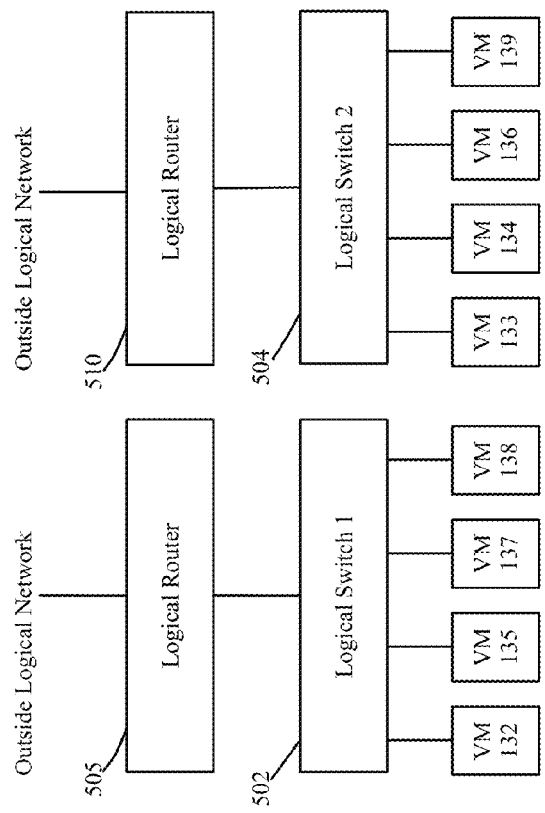
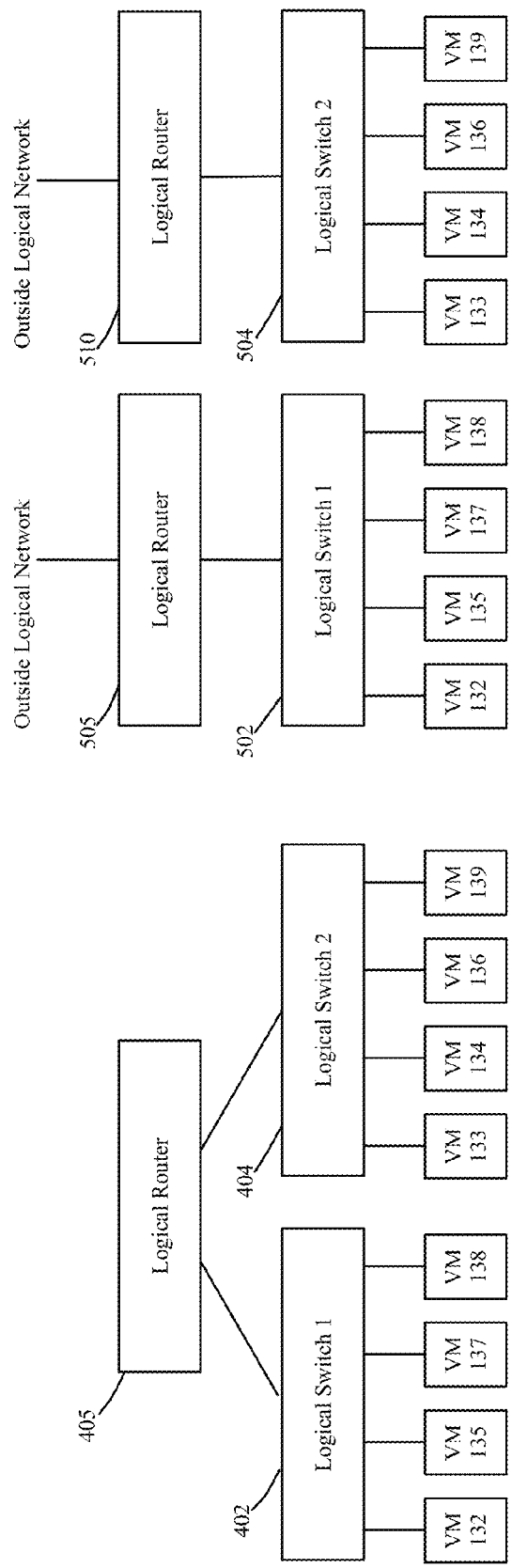
*Figure 2*
*Figure 4*
*Figure 5*

CONTROLLER SIDE METHOD OF GENERATING AND UPDATING A CONTROLLER ASSIGNMENT LIST

CLAIM OF BENEFIT TO PRIOR APPLICATIONS

This application claims benefit to U.S. Provisional Patent Application 61/889,519, filed Oct. 10, 2013, and U.S. Provisional Patent Application 61/890,321, filed Oct. 13, 2013, which are incorporated herein by reference.

BACKGROUND

To date, several solutions have been proposed for managing logical forwarding elements in virtualized computing environments. Some of these solutions use a cluster of controllers to manage the logical network elements. For some of these functionalities, these logical forwarding elements are implemented by physical forwarding elements (e.g., software or hardware switches) that are configured and managed by the controller cluster.

Some of the operations of these managed physical forwarding elements need data from the controllers to process packets or messages. These communications are typically out-of-band, control channel communications. Often, due to the large number of host computers that execute software forwarding elements, the controllers have control channel connections with a large number of host computers. Such large number of connections can tax the resources of any one controller, especially when the load is unevenly distributed between the controllers. Accordingly, there is a need for a novel scheme for distributing the control channel load on the controllers of a multi-controller network control system.

BRIEF SUMMARY

Some embodiments provide a novel method for distributing control-channel communication load between multiple controllers in a network control system. In some embodiments, the controllers manage physical forwarding elements that forward data between several computing devices (also called hosts or host computers), some or all of which execute one or more virtual machines (VMs). In some embodiments, some or all of managed physical forwarding elements are software forwarding elements that execute on host computers to implement different logical forwarding elements (e.g., logical switches, logical routers, etc.) for different virtual networks of different tenants, users, departments, etc. that use the same shared compute and networking resources. The controllers in some embodiments execute network control applications that manage the physical forwarding elements.

The method of some embodiments distributes a controller assignment list to the host computers. The host computers use this list to identify the controllers with which they need to interact to perform some of the forwarding operations of their associated logical forwarding elements. In some embodiments, agents executing on the host computers (1) review the controller assignment list to identify the appropriate controllers, and (2) establish control channel communications with these controllers to obtain the needed data for effectuating the forwarding operations of their associated physical forwarding elements. These agents in some embodiments are responsible for out-of-band control channel communication with the controllers.

To identify the appropriate controller for each logical forwarding element (LFE), the controller assignment list includes two parameters for each LFE. One parameter is an index value (called an index parameter) that is derivable from an identifier that identifies the LFE (called an LFE identifier). The other parameter is an identifier (called a controller identifier) that identifies a controller that is responsible for processing requests for the LFE. In some embodiments, the controller identifier is an address (e.g., IP address) of the controller, while in other embodiments, the controller identifier is a value from which the address of the controller can be obtained (e.g., through another table).

For each type of LFE managed by the network control system, the controllers and the hosts use the same index generation process to generate the index values for different LFEs of the same type. In some embodiments, the controllers and the hosts use the same index generation process for different types of LFEs, while in other embodiments they use different index generation process for different types of LFEs. In some embodiments, one controller (i.e., a master controller) creates the controller list by (1) assigning each LFE to a controller, (2) using the appropriate index generation process or processes to generate the index values from the LFE identifiers, and (3) creating for each LFE a record in the controller list that specifies the LFE's assigned controller in terms of the controller's identifier and the LFE's derived index value. In some embodiments, the controller set (e.g., the master controller) does not explicitly generate the index values from the LFE identifiers (the LFEIs), but rather assigns a defined range of index values to the different controllers, as further described below.

An agent of a host can identify the controller for a particular LFE executing on the host by (1) using the index generation process for the correct LFE type to generate an index value and (2) using the generated index value to retrieve the controller identifier from the controller assignment list. The retrieved controller identifier specifies the controller for the agent to connect in order to obtain necessary data for processing requests associated with the particular LFE's operations. As mentioned above, the controller identifier in some embodiments specifies the address of the controller, while in other embodiments this identifier is used to retrieve the address of the controller (e.g., through another table). In some embodiments, an agent identifies a controller for an LFE while it is setting up the LFE on the host, or upon receiving a new controller assignment list from the controller. In some of these embodiments, the agent establishes a connection (e.g., a TCP/IP session) with the LFE's controller upon identifying the controller, so that it can use this connection to process subsequent LFE operations that need the controller's input.

The index generation process of some embodiments is a hash operation that maps identifiers for different types of LFEs to the same range of index values. For instance, in some embodiments, the hash operation ends with a modulo operation that expresses the final hashed index value in terms of an integer that is the remainder value of the operation. Using this approach, the controller set (e.g., the master controller) assigns the controllers to different ranges of the possible hash value. This assignment is done in a manner to achieve a desired load balancing across the controllers. For instance, in some embodiments, this assignment is uniform or approximately uniform in terms of the number of controllers and the number of LFEs. In some of these embodiments, the controller cluster (e.g., the master controller) assigns equal sized hash value ranges to different controllers as its distribution scheme distributes the LFE identifiers uniformly across the LFEI range in order to ensure even distribution across the hash value ranges. In other embodiments, this assignment is uniform or approximately uniform in terms of data that is collected dynamically, such as data traffic load for each LFE, the number of VMs for each LFE, etc.

Using a hash/modulo process allows the distribution method of some embodiments to assign a defined range of index values to the different controllers without requiring the controller cluster (e.g., the master controller) to explicitly compute an index value for each LFE. The host agents in these embodiments use the hashing process to generate an index value that identifies a controller in the controller assignment list. In some embodiments, the same hash/modulo process is used for different LFE types, as mentioned above. In other embodiments, different hash/modulo processes are used for different LFE types (e.g., in order to allow different LFE types to different hash value ranges).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 2 illustrates a logical L2 switch that is implemented by several physical forwarding elements.

FIGS. 4 and 5 illustrate logical L2 switches and L3 routers that are implemented by several physical forwarding elements.

FIG. 9 illustrates a case where the agent uses the connection list to contact the correct controller to process a data request for a logical switch, while

FIG. 15 illustrates a process for generating index values and assigning these index values to different controllers, while

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a multi-controller network control system with a novel scheme for distributing control-channel communication load between the different controllers. Under this scheme, a list of controller assignments is distributed to computing devices that need to have control-channel communication with the controllers in order to effectuate forwarding operations of the forwarding elements that are implemented by the computing devices. The controller assignment list stores the identity of the controllers for the different forwarding elements based on index values that are derivable from identifiers that identify the forwarding elements. The computing devices retrieve the controller identifiers from the controller assignment list by generating index values from the forwarding element identifiers and using these index values to identify the correct records in the controller assignment list.

Figure 1:
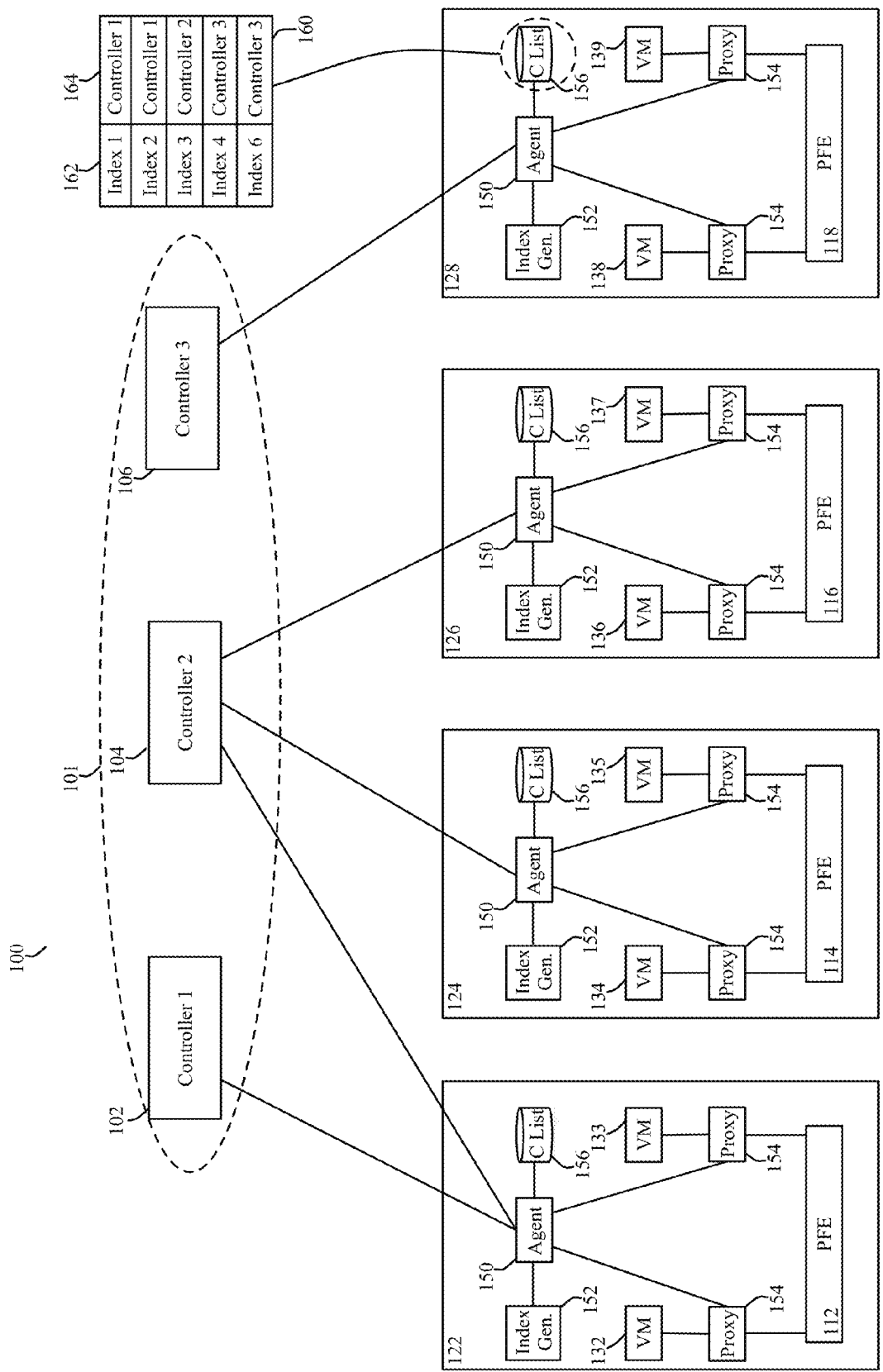
FIG. 1 illustrates a network control system that uses the novel controller load distribution scheme of some embodiments of the invention.

FIG. 1 illustrates a network control system 100 that uses the novel controller load distribution scheme of some embodiments of the invention. Specifically, it illustrates a cluster 101 of three controllers 102-106 that manage four physical forwarding elements 112-118 that execute on four computers 122-128 to forward data between these computers. Each computer executes two or more virtual machines (VMs) 132-138, one agent 150, an index generator 152, and a proxy 154 for each VM. Each computer also has a storage 156 for storing a controller assignment list.

In the example illustrated in FIG. 1, the managed physical forwarding elements 112-118 are software forwarding elements that execute on host computers 122-128. In other embodiments, however, one or more of these physical forwarding elements may be standalone hardware forwarding elements. Also, even though FIG. 1 illustrates one PFE executing on each host, some embodiments have more than one PFE of more than one PFE type executing on a host. For instance, each host in some embodiments executes an L2 switch and an L3 router, as further described below.

In the virtualization field, some refer to software forwarding elements (such as PFEs 112-118) as virtual switches as these are software elements. However, in this document, the software forwarding elements are referred to as physical forwarding elements, in order to distinguish them from logical forwarding elements, which are logical constructs that are not tied to the physical world. In other words, the software switching elements are referred to as PFEs because they exist and operate in the physical world, whereas logical forwarding elements are simply a logical representation of a forwarding element that is presented to a user. Examples of logical forwarding elements include logical switches, logical routers, etc.

The controller cluster 101 manages the physical forwarding elements 112-118 to implement different logical forwarding elements (LFEs) for different virtual networks of different tenants, users, departments, etc. that use the same shared compute and networking resources. For instance, as shown in FIG. 2, the physical forwarding elements 112-118 can perform L2 switch functionality and specify two different logical L2 switches 202 and 204, with each logical L2 switch connecting the VMs of a different entity. In this example, the logical L2 switch 202 connects four VMs 132, 135, 137 and 138 of one entity (e.g., one tenant) that execute on four different host computers 122-128, while logical L2 switch 204 connects four VMs 133, 134, 136 and 139 of another entity (e.g., another tenant) that execute on the same four host computers 122-128. The operation of each logical switch is distributed across the PFEs 112-118.

In some embodiments, a logical switch provides an L2 connectivity to VMs connected to the logical switch. The logical L2 connectivity may be VXLAN backed (and can also be implemented with any other overlay technologies like NVGRE, STT, etc.). When the logical L2 switch is implemented with VXLAN, VXLAN Network Identifier (VNI) may be used as the identifier of the LS.

To manage the physical forwarding elements, the controllers in some embodiments execute network control applications that direct the management of these elements. In some embodiments, the majority of the LFE operations are performed by the PFEs according to the configuration of these PFEs that is specified by the controller cluster 101. However, some of the LFE operations require real-time input from the controller clusters. Examples of such operations that require real-time input in some embodiments include ARP broadcasts, DHCP broadcasts, etc. These examples are described in concurrently filed U.S. patent application Ser. No. 14/070,360, entitled "Proxy Methods for Suppressing Broadcast Traffic in a Network," now issued as U.S. Pat. No. 9,548,965.

For such real-time input, each host has (1) a proxy 154 in the datapath between the VM and the PFE, and (2) an agent 150. The proxies 154 are used to capture certain requests (e.g., ARP requests) from the VMs and re-route these requests to the agents, so that the agents can communicate with the controllers and obtain data needed to process such requests. In some embodiments, the proxies are part of virtual network interface cards (VNICs) of the VMs or are part of PFEs (e.g., the virtual ports of the PFEs). In some of these embodiments, the proxies can be viewed as function calls to the agents.

In some embodiments, each agent 150 maintains one or more control channel communication sessions (e.g., TCP/IP sessions) with one or more controllers, in order to process such requests. FIG. 1 shows control channel connections (1) between controller 102 and agent 150 of computer 122, (2) between controller 104 and agents 150 of computers 122, 124 and 126, and (3) between controller 106 and agent 150 of computer 128.

Different controllers are responsible for processing requests for different LFEs. Accordingly, in some embodiments, each agent establishes out-of-band control channel communication connection (e.g., a TCP/IP connection) with each controller that is responsible for each LFE that is implemented or may be implemented with the agent's associated PFE. Several examples for establishing and eliminating such connections are further described below. In some embodiments, an agent can establish multiple different connections with the same controller for multiple different LFEs handled by the agent, while in other embodiments, an agent establishes only on connection with a controller for all LFEs handled by the agent.

The controller cluster 101 of some embodiments distributes a controller assignment list 160 to the host computers. The host computers use this list to identify the controllers with which they need to interact to perform some of the forwarding operations of the LFEs that their PFEs implement. In some embodiments, the agents 150 (1) review the controller assignment list to identify the appropriate controllers for the different LFEs, and (2) establish control channel communications with these controllers to obtain the data needed for effectuating the forwarding operations of their associated LFEs.

To identify the appropriate controller for each LFE, the controller assignment list includes two parameters for each LFE. One parameter is an index value 162 (called an index parameter) that is derivable from an identifier that identifies the LFE (called LFE identifiers). The other parameter is a controller identifier 164 (called a controller identifier) that identifies a controller that is responsible for processing requests for the LFE. In some embodiments, the controller identifier is an address (e.g., IP address) of the controller, while in other embodiments, the controller identifier is a value from which the address of the controller can be obtained (e.g., through another table).

For each type of LFE managed by the network control system, the controllers and the hosts use the same index generation process to generate the index values for different LFEs of the same type. In some embodiments, the controllers and the hosts use the same index generation process for different types of LFEs, while in other embodiments they use different index generation process for different types of LFEs. In some embodiments, one controller (i.e., a master controller) creates the controller list by assigning each LFE to a controller, using the appropriate index generation process or processes to generate the index values from the LFE identifiers, and creating for each LFE a record in the controller list that specifies the LFE's assigned controller in terms of the controller's identifier and the LFE's derived index value. In some embodiments, the controller set (e.g., the master controller) does not explicitly generate the index values from the LFE identifiers (the LFEIs), but rather assigns a defined range of index values (associated with a range of LFEIs) to the different controllers, as further described below.

An agent of a host can identify the controller for a particular LFE implemented by the host's PFE by (1) using the index generator 132 for the correct LFE type to generate an index value and (2) using the generated index value to retrieve the controller identifier from the controller assignment list 160 that is stored in the storage 156. The retrieved controller identifier specifies the controller for the agent to connect to in order to obtain necessary data for processing requests associated with the particular LFE's operations. As mentioned above, the controller identifier in some embodiments specifies the address of the controller, while in other embodiments this identifier is used to retrieve the address of the controller (e.g., through another table). In some embodiments, the agent identifies a controller for an LFE when it sets up the LFE on the host, or upon receiving a new controller assignment list from the controller. In some of these embodiments, the agent establishes a connection (e.g., a TCP/IP session) with the LFE's controller upon identifying the controller, so that it can later use this connection to process subsequent LFE operations that need the controller's input.

The index generation process of some embodiments is a hash operation that maps identifiers for different types of LFEs to the same range of index values. For instance, in some embodiments, the hash operation ends with a modulo operation that expresses the final hashed index value in terms of an integer that is the remainder value of the operation. Using this approach, the controller set (e.g., the master controller) assigns the controllers to different ranges of the possible hash value without explicitly generating any index value for any LFEI. In some embodiments, the assignment of the controllers to different ranges of hash values is done in a manner to achieve a desired load balancing across the controllers. For instance, in some embodiments, this assignment is uniform or approximately uniform in terms of the number of controllers and the number of LFEs. In some embodiments, the controller cluster (e.g., the master controller) assigns equal sized hash value ranges to different controllers as its distribution scheme distributes the LFE identifiers uniformly across the LFEI range in order to ensure even distribution across the hash value ranges. In other embodiments, this assignment is uniform or approximately uniform in terms of data that is collected dynamically, such as data traffic load for each LFE, the number of VMs for each LFE, etc.

As mentioned above, using a hash/modulo process allows the distribution scheme of some embodiments to assign a defined range of index values to the different controllers without requiring the controller set (e.g., the master controller) to explicitly compute an index value for each LFE. Only the host agents need to use the hashing process to generate an index value that identifies a controller in the controller assignment list. In some embodiments, the same hash/modulo process is used for different LFE types, as mentioned above. In other embodiments, different hash/modulo processes are used for different LFE types (e.g., in order to allow different LFE types to different hash value ranges).

Several more detailed examples of the operation of the agents 150 will be further described in Section I below. Next, in Section II, the operation of the controller cluster of some embodiments will further be described. Finally, Section III describes an electronic system with which some embodiments are implemented.

I. Host Side Operations

Figure 3:
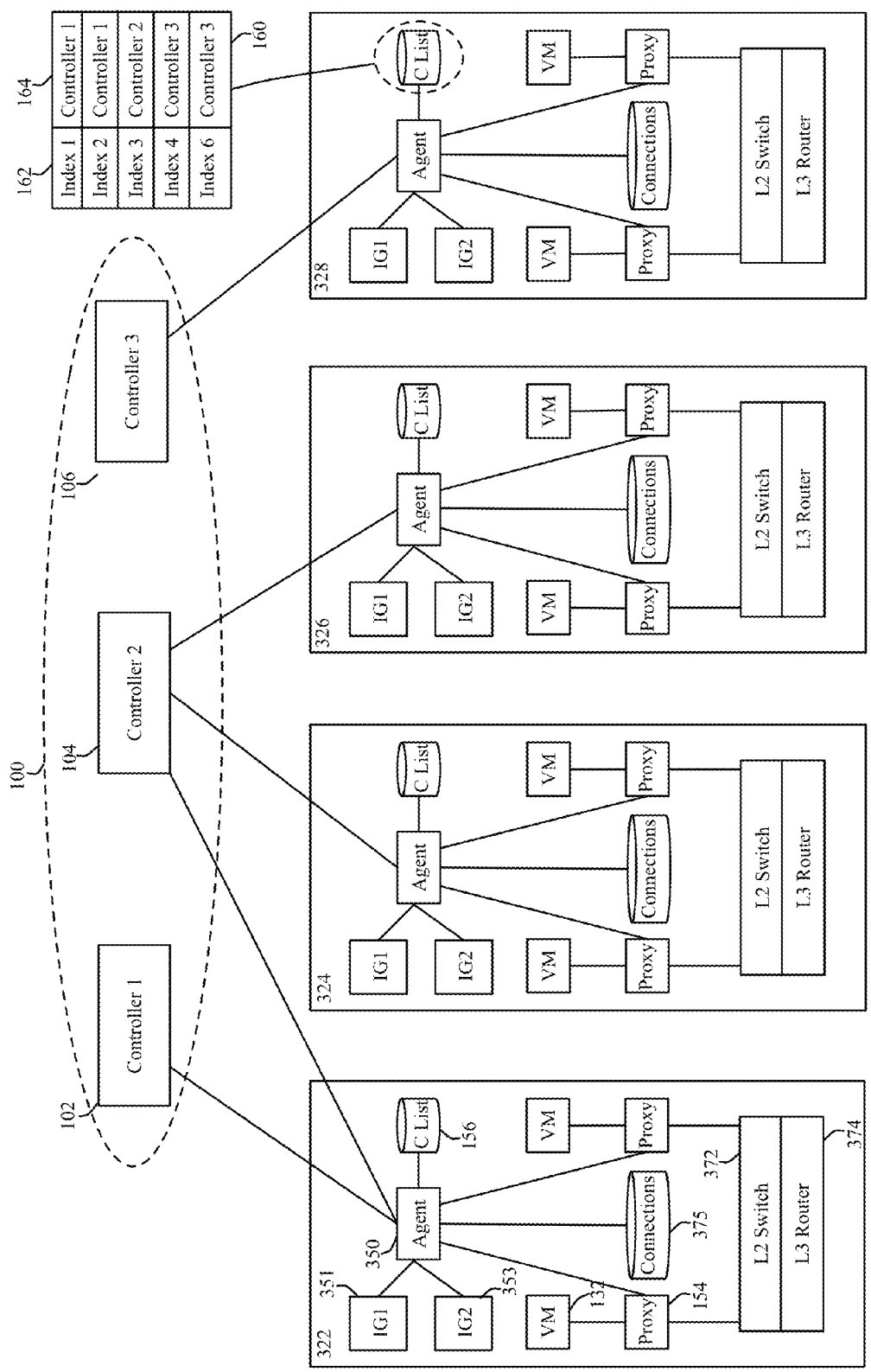
FIG. 3 illustrates another network control system that uses the novel controller load distribution scheme of some embodiments of the invention.

FIG. 3 illustrates a network control system 300 of some embodiments of the invention. This control system 300 is similar to the control system 100 of FIG. 1 with a few differences. Like the system 100, it includes a controller cluster 101 with three controllers 102-106 that manage physical forwarding elements that execute on four computers to forward data between these computers. Also, like the computers of the control system 100, the computers 322-328 of the system 300 execute two or more virtual machines (VMs) 132-138, one agent 350, and a proxy 154 for each VM. Each computer 322-328 also has a storage 156 for storing a controller assignment list.

However, unlike the computers 122-128, the computers 322-328 in the control system 300 each have two types of physical forwarding elements 372 and 374, two index generators 351 and 353, and a connection list 375. The two PFE types on each computer are an L2 switch 372 and an L3 router 374. Both these elements are software forwarding elements that execute on host computers 322-328.

These elements are managed by the controller cluster 101 to implement different logical switches (LS's) and different logical routers (LRs) for different virtual networks of different tenants, users, departments, etc. that use the same shared compute and networking resources. For instance, as shown in FIG. 4, the L2 switches 372 in the various hosts can be configured to specify two different logical switches 402 and 404, while the L3 routers in these hosts can be configured to specify a logical router 405. In this arrangement, each logical switch may be connecting different groups of VMs of a tenant and each logical switch connects to the other logical switch through the logical router so that all of the VMs of the tenant can be connected through the logical network formed by the logical switches and the logical routers.

FIG. 5 illustrates another example of the distributed network topology that can be created with the logical switches and routers that are implemented by the L2 switches 372 and L3 routers 374 of the computers 322-328. In this network topology, each logical switch (LS) 502 or 504 still provides L2 connectivity between several VMs. Each logical router 505 or 510 serves as an L3 interface between its distributed network's LS 502 or 504 and computing devices outside of its distributed network. The same functionality can also be provided in some embodiments by the logical router 405 of FIG. 4.

Like agents 150 and proxies 154 of control system 100, the agents 350 and proxies 154 of the control system 300 are used to obtain data in real-time from the controller cluster 101 in order to facilitate the performance of some of the LFE operations (i.e., LS operations or LR operations). Like the agents 150 of the system 100, the agents 350 of the system 300 (1) review the controller assignment list 160 that the controller cluster 100 distributes to identify the appropriate controllers for the various different LFEs, and (2) establish control communication channels with these controllers so that they can later use communication channels to obtain the needed data for effectuating subsequent forwarding operations of their associated LFEs.

The agents 350 of the system 300 use two different index generators 351 and 353 to generate index values for two different types of logical forwarding elements that their hosts execute. Specifically, the agents use the index generator 351 to generate index values for the different logical switches that their associated L2 switches 372 implement, while using index generator 353 to generate index values for the different logical routers that their associated L3 routers 374 implement. The index generator 351 generates its index values from the logical switch (LS) identifiers that identify the different LS's, while the index generator 353 generates its index values from the logical router (LR) identifiers that identify the different LRs. In some embodiments, the LS or LR identifier is an identifier that uniquely specifies a logical switch or logical router in a locality (e.g., a data center or a group of hosts in a data center), while in other embodiments the identifier is an identifier that represents an LFE that spans multiple localities (e.g., spans two data centers). As mentioned above, the LS identifier in some embodiments is the VNI of a logical switch. While FIG. 3 and some of the subsequent figures show two index generators for generating index values from the LS identifiers and the LR identifiers, the agents of some embodiments use one index generator for both LS and LR identifiers.

In some embodiments, the agent uses the index generator and the controller assignment list when it is setting up a LS or LR on its host, or when it receives a new controller assignment list to process from the controller. After obtaining an index value for a particular LS or LR from an index generator, an agent (1) uses the generated index value to retrieve the controller identifier from the controller assignment list 160, (2) establishes a connection (e.g., a TCP/IP session) with the identified controller, and (3) stores the identity of this controller and/or this established connection in the connection list 375. As further described below, the agent subsequently uses the connection list 375 to identify the controller or connection to use to process subsequent operations of the particular LS or LR.

The operation of an agent 350 in the control system 300 will now be further described by reference to the process 600 of FIG. 6. An agent 350 performs the process 600 in some embodiments each time its host boots up, and the agent needs to establish its control channel communication sessions with the controllers. The process 600 will be described below by reference to FIGS. 7-10, which illustrate examples of sub-operations of this process.

Figure 6:
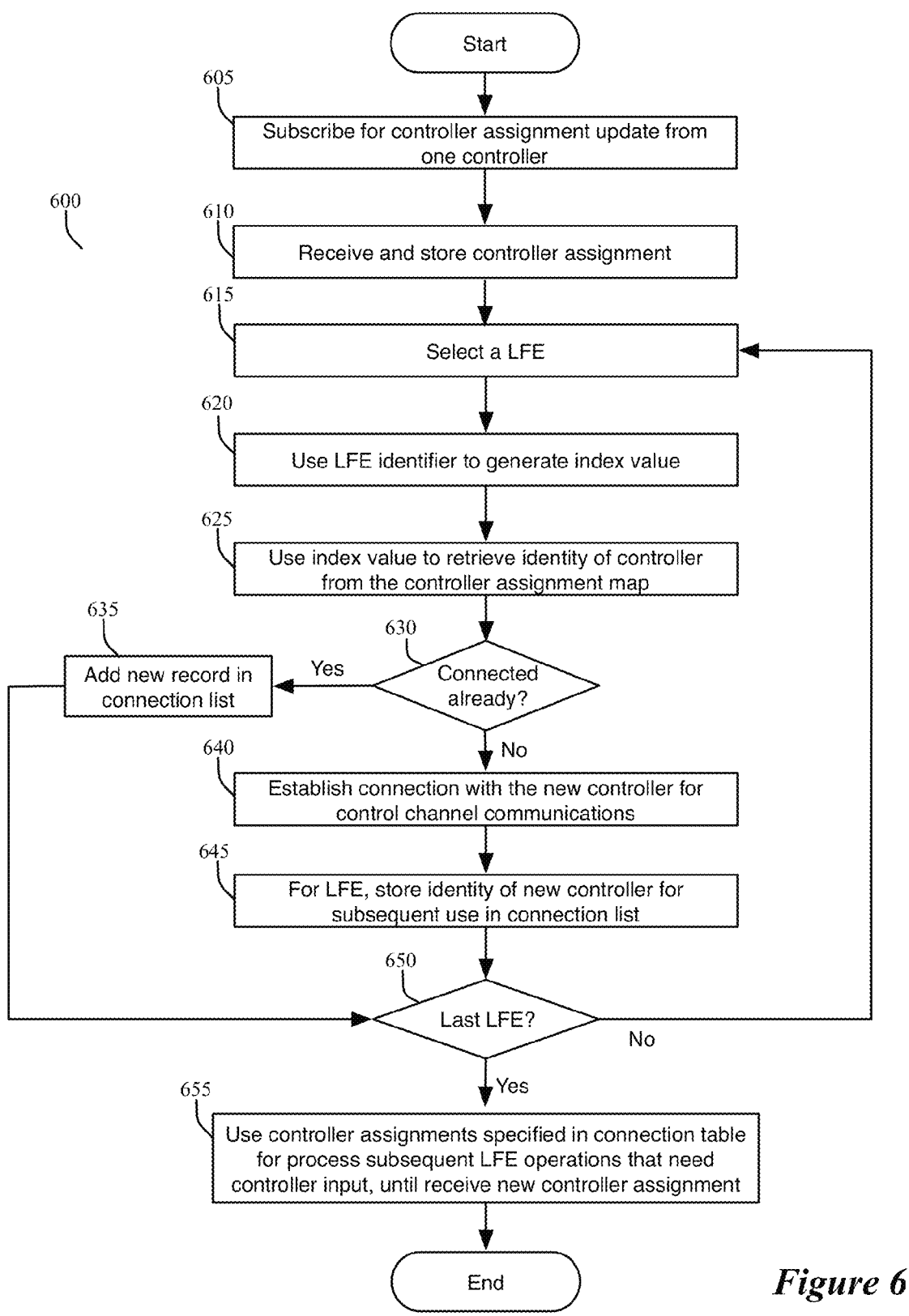
FIG. 6 illustrates a process that a host's agent performs in some embodiments to establish control channel communication sessions with the controllers.
Figure 7:
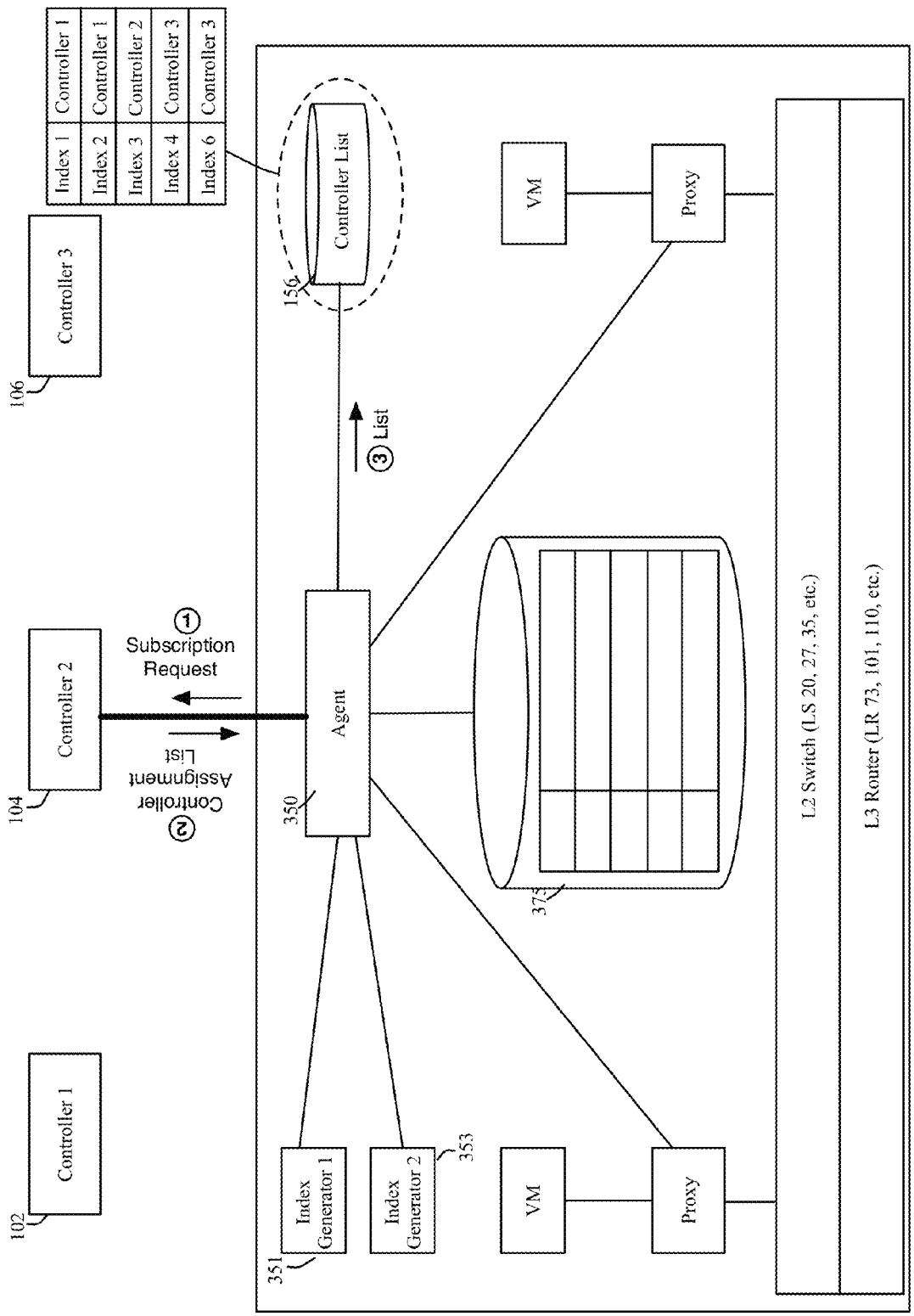
FIG. 7 illustrates an example of an agent subscribing to a controller, receiving a controller assignment list from this controller, and storing the controller assignment list in a storage.

As shown in FIG. 6, the process 600 initially subscribes (at 605) to a controller to receive a controller assignment list and to receive subsequent updates to this list. In some embodiments, the agent is configured to contact one controller to request such a subscription. In other embodiments, however, the agent is configured to randomly pick one controller for a pool of potential controllers as the controller to contact to receive the controller assignment list and updates to this list. After subscribing to one of the controllers, the process 600 receives (at 610) a controller assignment list from the controller to which it subscribed. The process stores (at 610) this list locally on the host. FIG. 7 illustrates an example of the agent 350 subscribing to the controller 104, receiving a controller assignment list from this controller, and storing the controller assignment list in the storage 156.

Next, at 615, the process selects a logical forwarding element (LFE) that a physical forwarding element of its host has to implement or should be prepared to possibly implement. In some embodiments, even when a host's PFE is not implementing an LFE, it is set up for the LFE so that it can be ready to seamlessly join the implementation of the LFE when a VM that uses the LFE is instantiated on the host. For instance, in some embodiments, a host is prepared to implement an LFE when the host is part of a computational cluster of hosts and one of the other hosts in the cluster is currently implementing the LFE.

As mentioned above, examples of LFEs include LS's and LRs. Accordingly, at 615, the process may select any LS or LR that it has to implement or should be prepared to implement. Next, at 620, the process uses the selected LFE's identifier to generate an index value. To do this, the process uses the index generator 351 or 353 that is appropriate for the LFE's type (e.g., uses the L2 index generator if the selected LFE is a LS, and uses the L3 index generator when the selected LFE is a LR). As mentioned above, some embodiments use one index generator for different types of LFEs.

At 625, the process uses the generated index value to retrieve the identity of the controller for the selected LFE (i.e., the LFE selected at 615) from the controller assignment list. In other words, at 625, the process identifies the record in the list that has an index value that matches the generated index value, and retrieves the controller identifier of this identified record.

At 630, the process determines whether it previously created a connection to the identified controller (i.e., the controller identified at 625) for another LFE. This determination is made because the process 600 of some embodiments only makes one control channel connection between each host agent and a controller, and uses this connection to obtain from the controller data for all LFEs handled by the controller. In other embodiments, however, the process establishes multiple control channel connections between an agent and a controller, because the process in these embodiments establishes a unique control channel connection between the agent and the controller for each LFE handled by the controller.

When the process determines (at 630) that it previously created a connection to the identified controller, it adds (at 635) a new record in the connection list to specify this connection and/or the identified controller for the LFE selected at 615. The creation of records in the connection list is further described below by reference to operation 645. At 635, the process of some embodiments uses the previously specified connection to send to the controller dynamic data pertaining to the selected LFE. Examples of such data include ARP table for an L2 logical switch and a routing table for an L3 logical router. The controller uses this data to subsequently process data requests from the agent. From 635, the process transitions to 650, which will be further described below.

When the process determines (at 630) that it did not previously create a connection to the identified controller, it establishes (at 640) a connection with the controller identified at 625. In some embodiments, the connection is a TCP/IP connection. The agent will subsequently use this connection to communicate with the controller to process certain operations of the LFE. In some embodiments, the controller might reject a request from the process 600 to establish a connection to handle data requests for a particular LFE. For instance, in some cases, the controller might not have received the controller assignment list that specifies that the controller is responsible for the particular LFE. To account for such circumstances, the process 600 sets a timer (at 630) when its connection request is rejected, so that it can re-submit the request again once the timer expires, by which time the controller should have received the new controller assignment list. In some embodiments, the process re-sets the timer multiple times when the controller rejects a connection request multiple times, in order to give the controller sufficient time to receive a new controller assignment list. The setting and use of this timer will be further described below by reference to FIG. 21.

At 640, the process also sends dynamic data to the controller once the controller accepts the connection. This dynamic data includes data pertaining to the selected LFE. Examples of such data include an ARP table for an L2 logical switch and a routing table for an L3 logical router. The controller uses this data to subsequently process data requests from the agent (e.g., process ARP requests from the host agents, or distribute routing table to the hosts).

After 640, the process stores (at 645) the identity of the new controller and/or identity of the newly established connection in the connection list 375 for the LFE. Specifically, in some embodiments, a record is created in the connection list that specifies the LFE, the identifier for its associated controller, and the identifier for the connection session. In some embodiments, the connection session is not stored in this connection list. As mentioned above, and further described below, the agent uses the connection list to process subsequent LFE operations that need controller input.

At 650, the process determines whether it has examined all the LFEs that its host has to implement or be prepared to implement. If so, it transition to 655, which will be further described below. Otherwise, the process transitions to 615 to select another LFE and repeat its operations 620-650 for this LFE.

Figure 8:
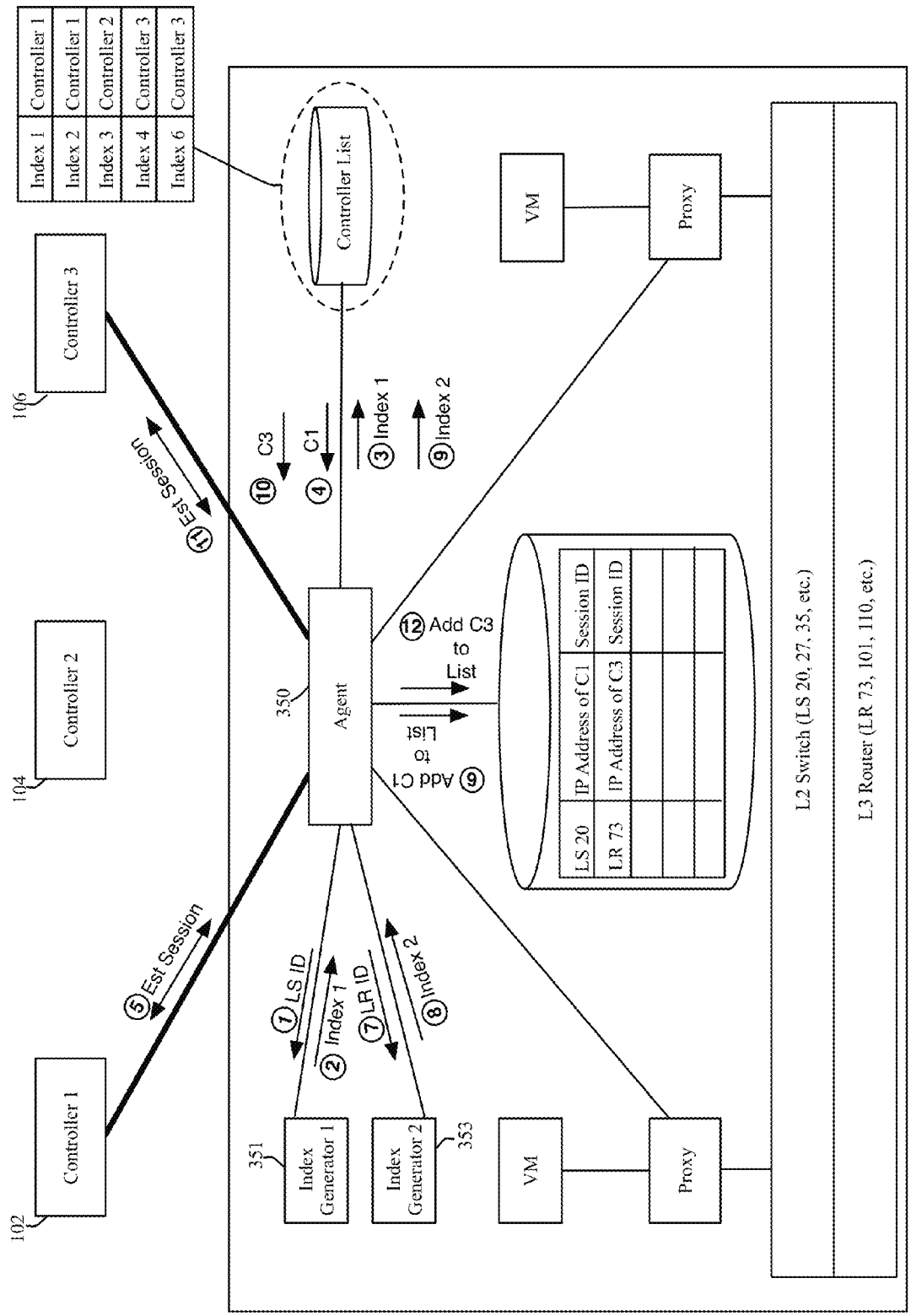
FIG. 8 illustrates an example of the agent using the index generators to generate index values for its associated logical forwarding elements (LFEs), identifying corresponding controllers in the controller assignment list based on the generated index values, establishing connections with the identified controllers, and storing the identities of the controllers and/or connections for the LFEs in the connection lists.

To further explain operations 620-645, FIG. 8 illustrates an example of the agent 350 using the index generators to generate index values for its associated LFEs, identifying corresponding controllers in the controller assignment list based on the generated index values, establishing connections with the identified controllers, and storing the identities of the controllers and/or connections for the LFEs in the connection lists. In the example illustrated in FIG. 8, one connection is established between the agent 350 and the controller 102 for the LS 20, and another connection is established between this agent and the controller 106 for the LR 73. These two logical elements (LS 20 and LR 73) are two LFEs of several LFEs (including LS 27, LS 35, LR 101, LR 110, etc.) that the L2 switch and L3 router of the host implement. The connections for these other LFEs (LS 27, LS 35, LR 101, LR 110, etc.), and the creation of these connections, are not shown in order not to obscure the description with unnecessary detail.

In FIG. 8, the creation and storage of the connections for the LS 20 and LR 73 are shown each as a set of six operations, operations 1-6 for the LS 20, and operations 7-12 for the LR 73. Each six operation set includes (1) directing (1 or 7) the appropriate index generator to generate an index value from the LS identifier or the LR identifier, (2) obtaining (2 or 8) the generated index value from the index generator, (3) examining (3 or 9) the controller assignment list for the controller identifier associated with the generated index value, (4) retrieving (4 or 10) the controller identifier based on the index value, (5) establishing (5 or 11) a connection with the identified controller, and (6) storing (6 or 12) the identity of the controller and/or the connection in the connection list along with the associated identifier of the LS or LR. As shown in FIG. 8, the connection list includes a record for the connection with controller 1 for LS 20, and a record for the connection with controller 3 for the LR 73. Each of these records includes the IP address of its corresponding controller and the session identifier (e.g., TCP/IP session) of its corresponding connection. Instead of the controller IP address, other embodiments use other attributes of a controller such as the controller's identifier in the connection list. Also, other embodiments do not store the session identifier for the connection.

When the process determines (at 650) that it has examined all the LFEs that its host has to implement or be prepared to implement, it uses (at 655) the controller connections specified in the connection list to process subsequent LFE operations that need controller input, until the agent receives an update to the controller assignment list. The operation of the agent when it receives an updated controller assignment list will be further described below by reference to FIG. 11.

Figure 9:
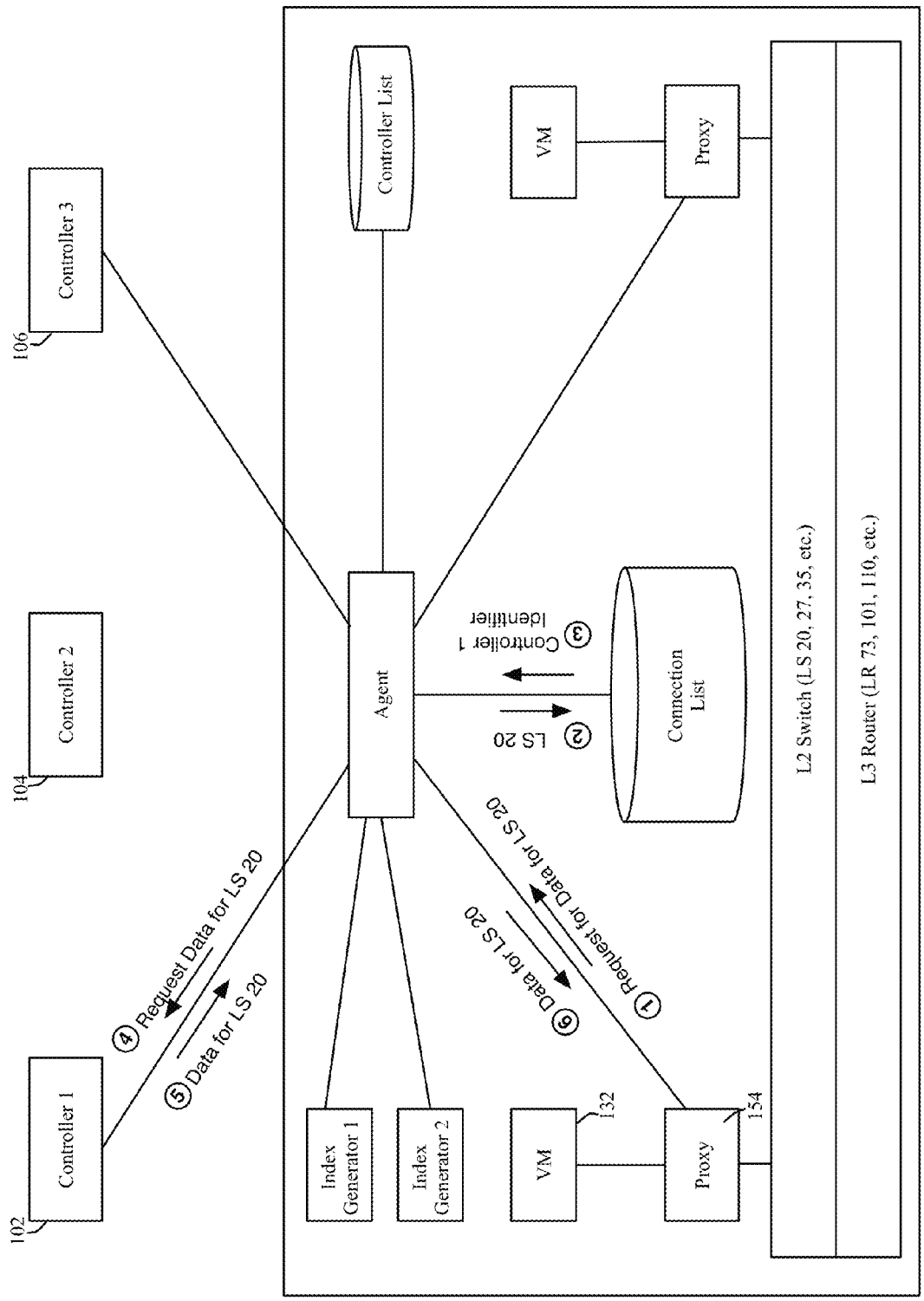
Figure 10:
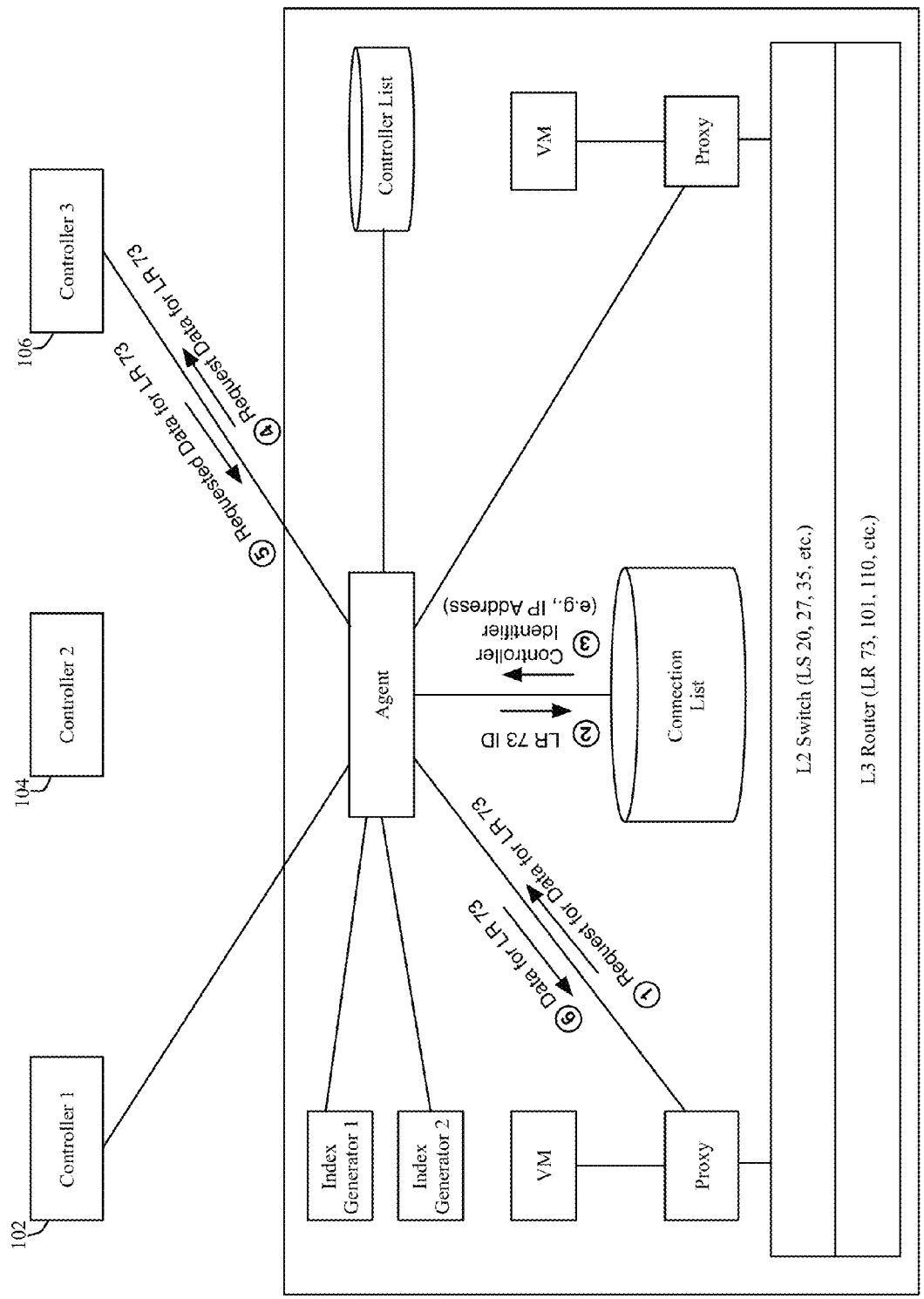
FIG. 10 illustrates a case where the agent uses the connection list to contact the correct controller to process a data request for a logical router.

FIGS. 9 and 10 illustrate two examples that further explain the operation 645 of the process 600. FIG. 9 illustrates the case where the agent 350 uses the connection list to contact the correct controller to process a data request for LS 20, while FIG. 10 illustrates the case where the agent 350 uses the connection list to contact the correct controller to process a data request for LR 73. In the example illustrated in FIG. 9, the agent:

(1) from a VM's associated proxy 154, receives a request for data for performing an operation for LS 20 with which the VM is associated, (2) searches the connection list for the controller responsible for LS 20, (3) retrieves the identifier (e.g., the IP address) of controller 1, (4) sends a request for the desired data to the identified controller 1, (5) receives the requested data from the controller 1, and (6) passes the received data to the requesting proxy.

An example of such an LS request is an ARP (address resolution protocol) request. A VM sends an ARP request when it needs to identify the MAC (media access control) address for another VM or device for which it has an IP address. ARP requests are broadcast requests that consume a lot of resources in hosted, virtualized environments, especially as the number of hosts and/or VMs increases. Accordingly, some have suggested a proxy based scheme for suppressing ARP broadcast messages, as described in concurrently filed U.S. patent application Ser. No. 14/070,360, entitled "Proxy Methods for Suppressing Broadcast Traffic in a Network," now issued as U.S. Pat. No. 9,548,965. In this scheme, a proxy (like proxy 152 of FIG. 9) is used to intercept an ARP request and re-route it to an agent (like agent 350 of FIG. 9), which then routes this request to the appropriate controller to retrieve the desired MAC address. For such a scheme, the example illustrated in FIG. 9 and the process 600 illustrated in FIG. 6 can be used to identify the correct controller to contact to handle ARP requests for a particular LS. U.S. patent application Ser. No. 14/070,360, entitled "Proxy Methods for Suppressing Broadcast Traffic in a Network," now issued as U.S. Pat. No. 9,548,965, is incorporated herein by reference.

In the example illustrated in FIG. 10, the agent:

(1) from a VM's associated proxy 154, receives a request for data for performing an operation for LR 73 with which the VM is associated, (2) searches the connection list for the controller responsible for LR 73, (3) retrieves the identifier (e.g., the IP address) of controller 3, (4) sends a request for the desired data to the identified controller 3, (5) receives the requested data from the controller 3, and (6) passes the received data to the requesting proxy.

An example of such a LR request is a DHCP (dynamic host configuration protocol) request. A VM sends a DHCP discover broadcast when it needs to identify a DHCP server to provide it with DHCP configuration data. Like ARP requests, DHCP requests are broadcast requests that consume a lot of resources in hosted, virtualized environments, especially as the number of hosts increases. Accordingly, some have suggested a proxy based scheme for suppressing DHCP broadcast messages, as described in U.S. patent application Ser. No. 14/070,360, entitled "Proxy Methods for Suppressing Broadcast Traffic in a Network," now issued as U.S. Pat. No. 9,548,965. In this scheme, a proxy (like proxy 152 of FIG. 10) is used to intercept a DHCP request and re-route it to an agent (like agent 350 of FIG. 10), which then routes this request to the appropriate controller to receive the appropriate DHCP messages and configuration. For such a scheme, the example illustrated in FIG. 10 and the process 600 illustrated in FIG. 6 can be used to identify the correct controller to contact to handle DCHP discover broadcast messages for a particular LR.

Another example of processing LR requests relates to the operation of publishing routing tables from an edge virtual router to non-edge virtual routers. An edge virtual router is a virtual router that handles north or south traffic out of or and into the virtual L3 network. The non-edge virtual routers are virtual routers that handle east-west traffic within the virtual L3 network. In a virtual L3 network that has both edge and non-edge virtual routers, the edge routers publish their routing tables to the non-edge virtual routers. To do this, each edge virtual router of a virtual L3 network uses the controller identification process of some embodiments to identify the correct controller to send its routing tables, so that this controller can push these tables to the non-edge virtual routers in the same virtual L3 network or can serve as a node from which these non-edge virtual routes can pull these tables.

Figure 11:
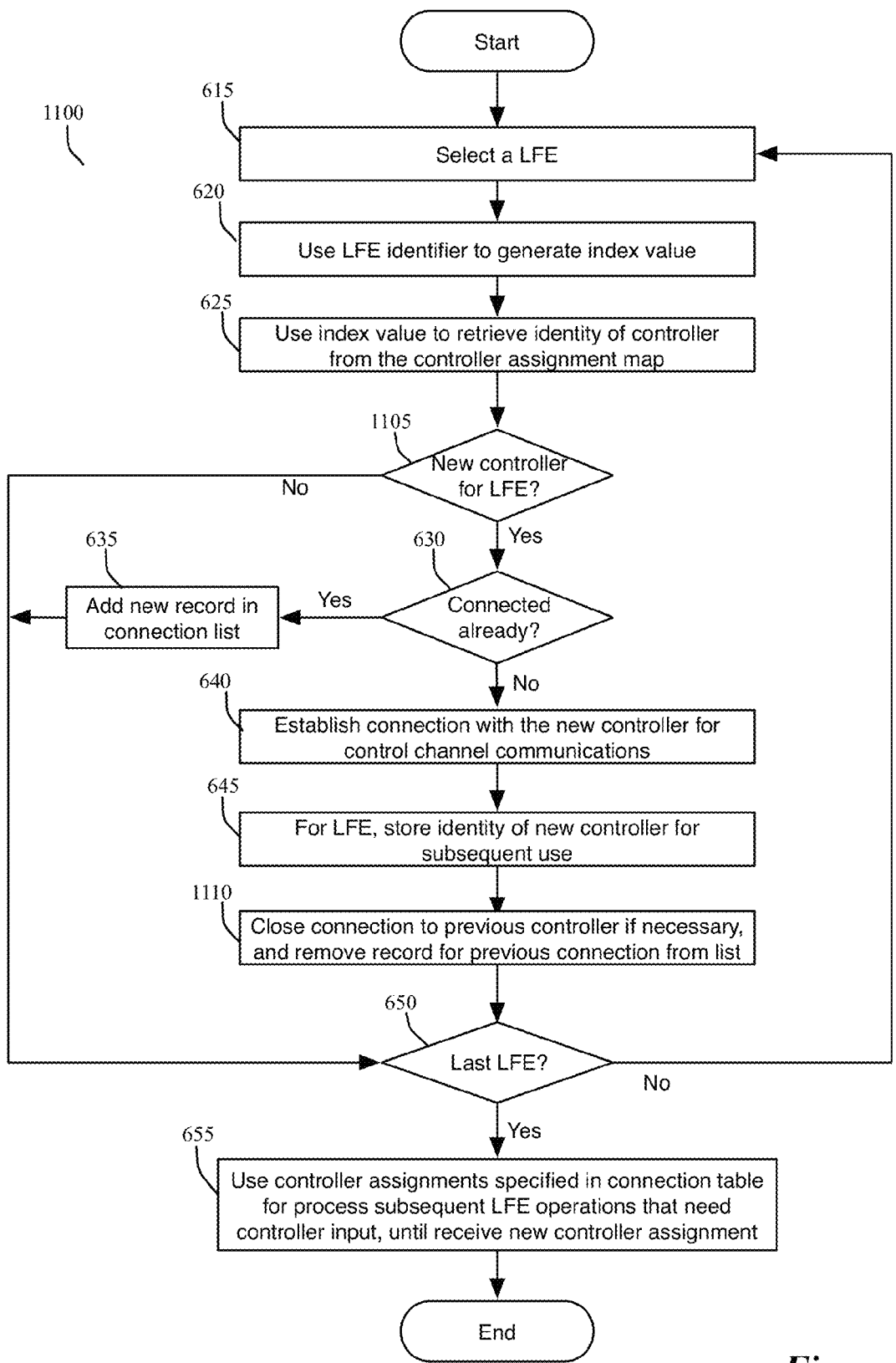
FIG. 11 illustrates a process that the agent performs when it receives and stores an updated controller assignment list, in order to update its connection list to reflect the changes in the updated controller assignment list.

FIG. 11 illustrates a process 1100 that the agent performs when it receives and stores an updated controller assignment list, in order to update its connection list to reflect the changes in the updated controller assignment list. The process 1100 is an asynchronous process because the agent performs this process whenever it asynchronously receives an updated controller assignment list from the controller cluster (e.g., from the controller to which the agent subscribed). This process is very similar to the process 600 of FIG. 6, in that it includes operations 615-625, 630-645, and 650-655. The only difference is that it does not include operation 605 and 610, while including operations 1105 and 1110.

It does not include the subscription operation 605 as the agent previously subscribed to a controller to receive updates to the controller assignment list. Also, the storage operation 610 is not shown in FIG. 11, as the description of the process 1100 starts after the agent receives and stores an updated controller assignment list.

The process 1100 performs the operation 1105 to identify new controller assignments for the LFEs. Specifically, after identifying a controller (in the controller assignment list) for a selected LFE, the process 1100 determines (at 1105) whether it previously specified the identified controller as the controller for the selected LFE in the connection list 375. If so, it skips operations 640, 645, and 1110, and transitions to 650.

Otherwise, the process 1100 transitions to 640 to perform the above-described operations 640 and 645 to establish a connection with the newly specified controller identified at 625 and store the identity of this controller and/or this connection in the connection list for the selected LFE. After recording this controller and/or connection in the connection list, the process 1100 closes (at 1110) the connection to the controller that was previously specified for the selected LFE, if this connection is not being used by the host's agent for any other LFE. Also, at 1110, the process removes this previous connection from the connection list for the LFE. In some embodiments, the process 1100 performs the operations at 1110 before it records (at 645) the new connection to the new controller.

In some embodiments, each time that each controller sends its subscribed hosts updated controller lists, it might not include the entire list, but only include the records in this list that have been updated. This might be the case because in some embodiments, the master controller does not distribute the controller assignment list in its entirety each time that it updates this list. Rather, each time that it updates a portion of the master controller list, the master controller of some embodiments also distributes only the portion of the controller assignment list that it has updated.

II. Controller Side Operation

Figure 12:
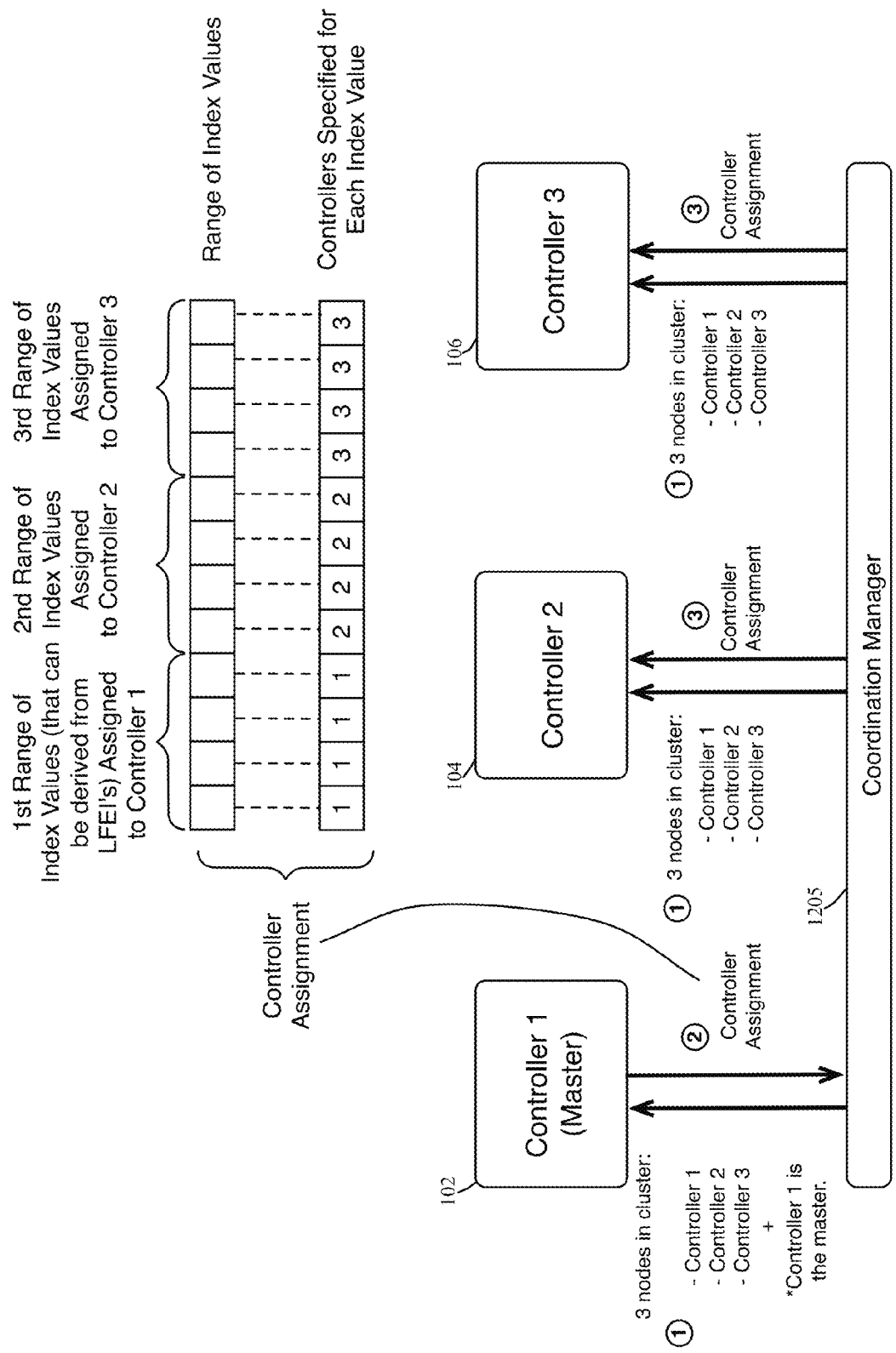
FIG. 12 illustrates an example of how the controller cluster of some embodiments generates a controller assignment list.

FIG. 12 illustrates an example of how the controller cluster of some embodiments generates a controller assignment list. Specifically, it illustrates three controllers 102, 104 and 106 that operate on top of a distributed coordination management layer 1205. The coordination management layer allows the controllers to coordinate one or more of their activities. One of their activities is the election of a master controller, so that this controller can then generate the controller assignment list and distribute this list to the other controllers.

In some embodiments, the coordination management layer has a coordination manager instance executing on each controller. In these embodiments, the different instances of the coordination manager on the different controllers communicate in order to achieve several objectives. These objectives in some embodiments include: (1) keeping status of all controller nodes, such as their IP address, their UUID (universally unique identifier), and when they join/leave the cluster, (2) synchronizing data between controller nodes, and (3) selecting a master for the control-cluster, and reselecting the master when the previous master controller leaves the cluster. One example of a distributed coordination management layer that can be used to perform this functionality is the Zookeeper program. Additional examples of the coordination management layer are described in U.S. Published Patent Application 2013/0058356.

As shown in FIG. 12, the first operation is the coordination management layer's notification to each controller of the identity of the other controllers in the controller cluster. This operation also entails notifying the controller that has been elected as the master controller that it is the master controller. For instance, in the example illustrated in FIG. 12, the controller 102 is notified that it is the master controller, and each controller is notified that the cluster contains the three controllers 102, 104, and 106.

The second operation is the master controller 102 generating the controller assignment list, and sending this list to the other controllers. The third operation is the non-master controllers receiving the controller assignment list. As shown in FIG. 12, the controller assignment list in some embodiments segments the possible index values into several different ranges, and assigns these ranges to three different controllers 102, 104 and 106. The index values are to be used to match to index values that the host agents generate from the identifiers of the LFE. By matching the index values, the agents can identify the records in the controller assignment list that specify the controllers for the LFEs.

Different embodiments have the master controller generate the controller list differently. For instance, some embodiments have the agents use a hash/modulo operation that maps all possible LFE identifiers to a common range of index values. For some of these embodiments, the master controller does not explicitly generate the index values for the different LFE identifiers. Rather, it simply segments the possible index values into several different ranges, and assigns the different ranges to the different controllers.

Figure 13:
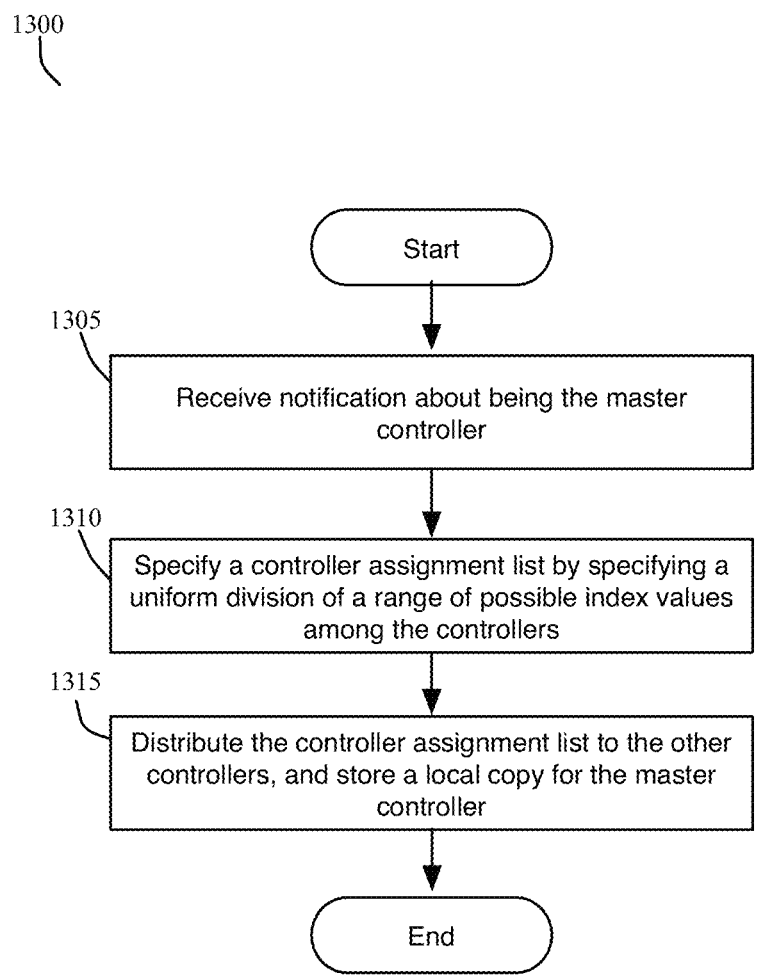
FIGS. 13 and 14 illustrate how the master controller of some embodiments generates the controller assignment list without explicitly generating the index values for the different possible identifiers of the logical forwarding elements.
Figure 14:
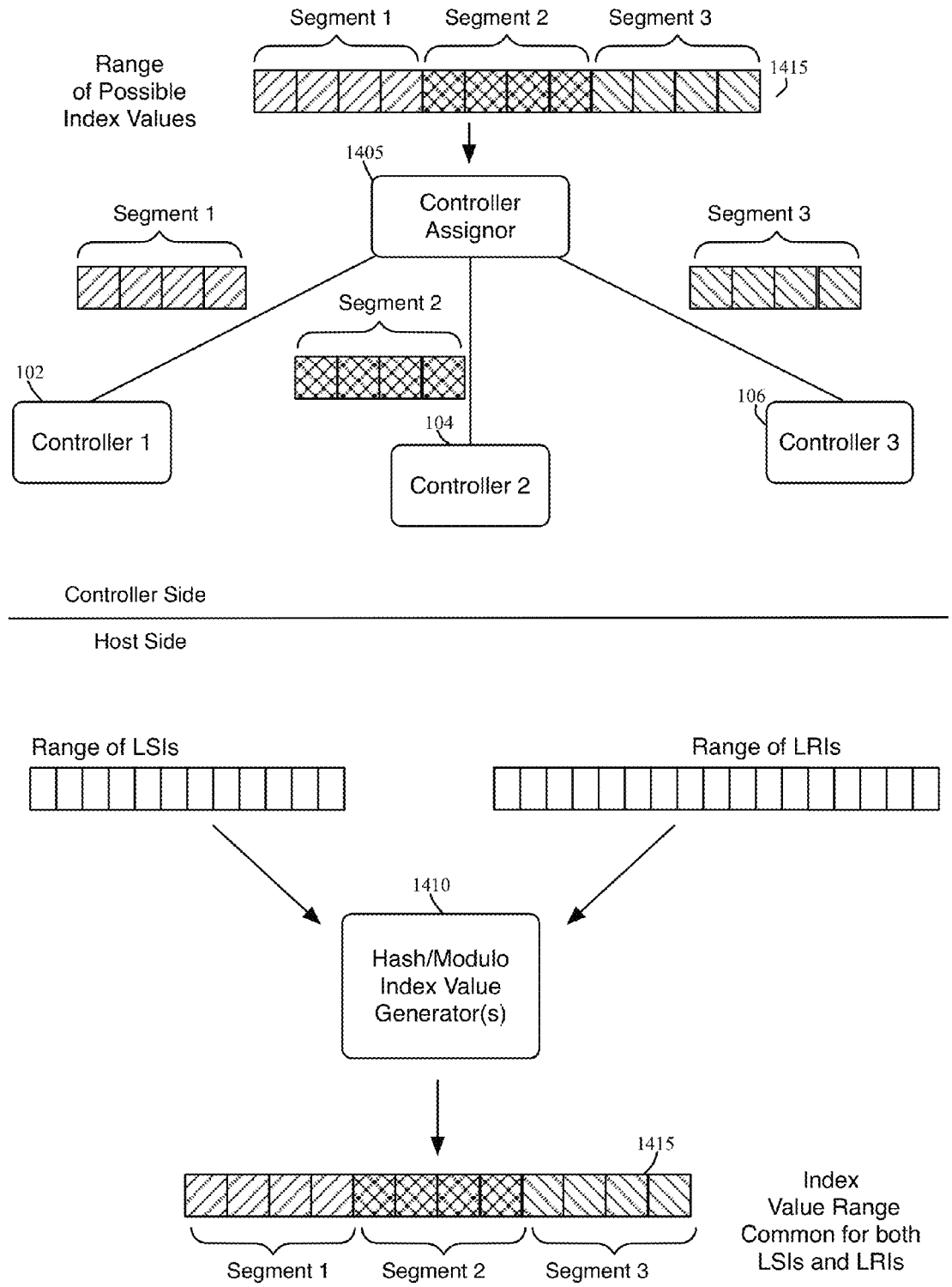

FIGS. 13 and 14 illustrate how the master controller of some embodiments generates the controller assignment list without explicitly generating the index values for the different possible LFE identifiers. Specifically, FIG. 13 illustrates a process 1300 performed by the master controller, while FIG. 14 presents a pictorial illustration of the segmentation of an index value range on the controller side and the generation of index values on the host side.

FIG. 13 illustrates that the process 1300 initially receives (at 1305) a notification that its controller is the master controller. Next, at 1310, the process specifies the controller assignment list by dividing the possible index value range into several index value segments, with each segment being assigned to one controller. At 1315, the process distributes the controller assignment list to other controllers, and stores a local copy of this assignment list for the master controller.

FIG. 14 illustrates one example of generating a controller assignment list without explicitly generating the index values on the controller side. In this example, the host agents use hash/modulo index value generators that end a hash operation with a modulo operation that expresses the final hashed index value in terms of an integer that is the remainder value of the modulo operation. Because of this, the master controller simply selects the range of potential remainder values as the range of possible index values, and uniformly divides this range among the different controllers based on an assumption that the range of LFE identifiers will be uniformly spread so as to produce a uniform distribution across the range of possible index values.

In the example illustrated in FIG. 14, the range 1415 is the range of potential remainder values for the hash/modulo operation, and hence is selected by the master controller as the range of possible index values. As shown in this figure, the master controller divides this range 1415 into three equal sized segments and assigns each segment to one of the three controllers 102, 104 and 106.

FIG. 14 also shows the hash/modulo index value generator or generators 1410 of the host agents mapping the LS identifiers and LR identifiers to the range of possible index values, and hence to the segments in this range. In some embodiments, the index value generator 1410 multiplies LS identifier (e.g., the VNI of a logical switch) or an LR identifier (e.g., the LRI of a logical router) with a large number, and then performs a modulo operation to obtain a remainder value that serves as the logical switch's or logical router's index value. In some of these embodiments, the index value generator uses a Knuth multiplicative hash to generate evenly distributed random index numbers.

The host agents can then use the generated index values to retrieve controller identifiers from the controller assignment list for the different LFEs. Based on the values of the LS and LR identifiers, some of the index values may go unused by the host agents. However, the use of the hash/modulo index value generator(s) by the host agents allows the controller cluster (e.g., the master controller) to forego explicitly computing an index value for each LFE.

Figure 15:
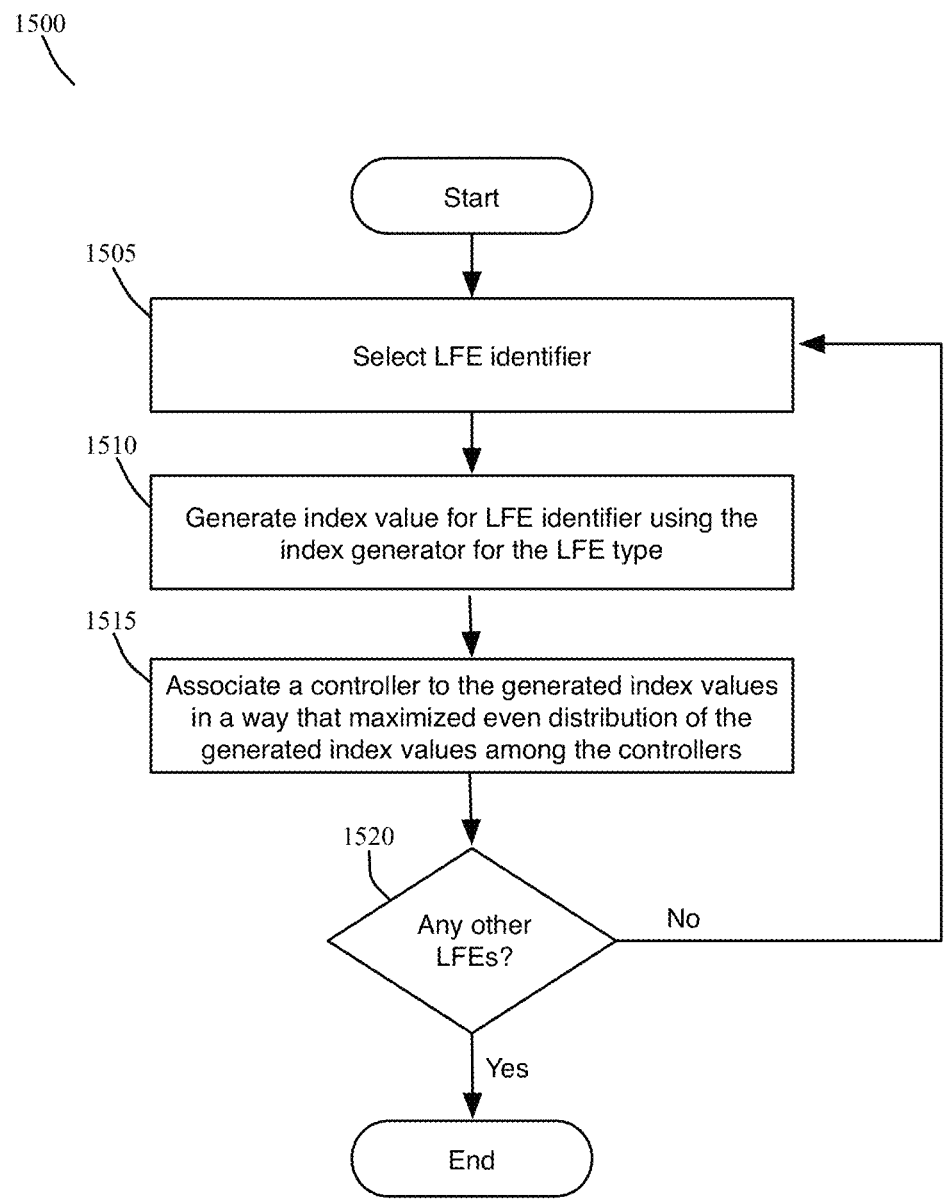
Figure 16:
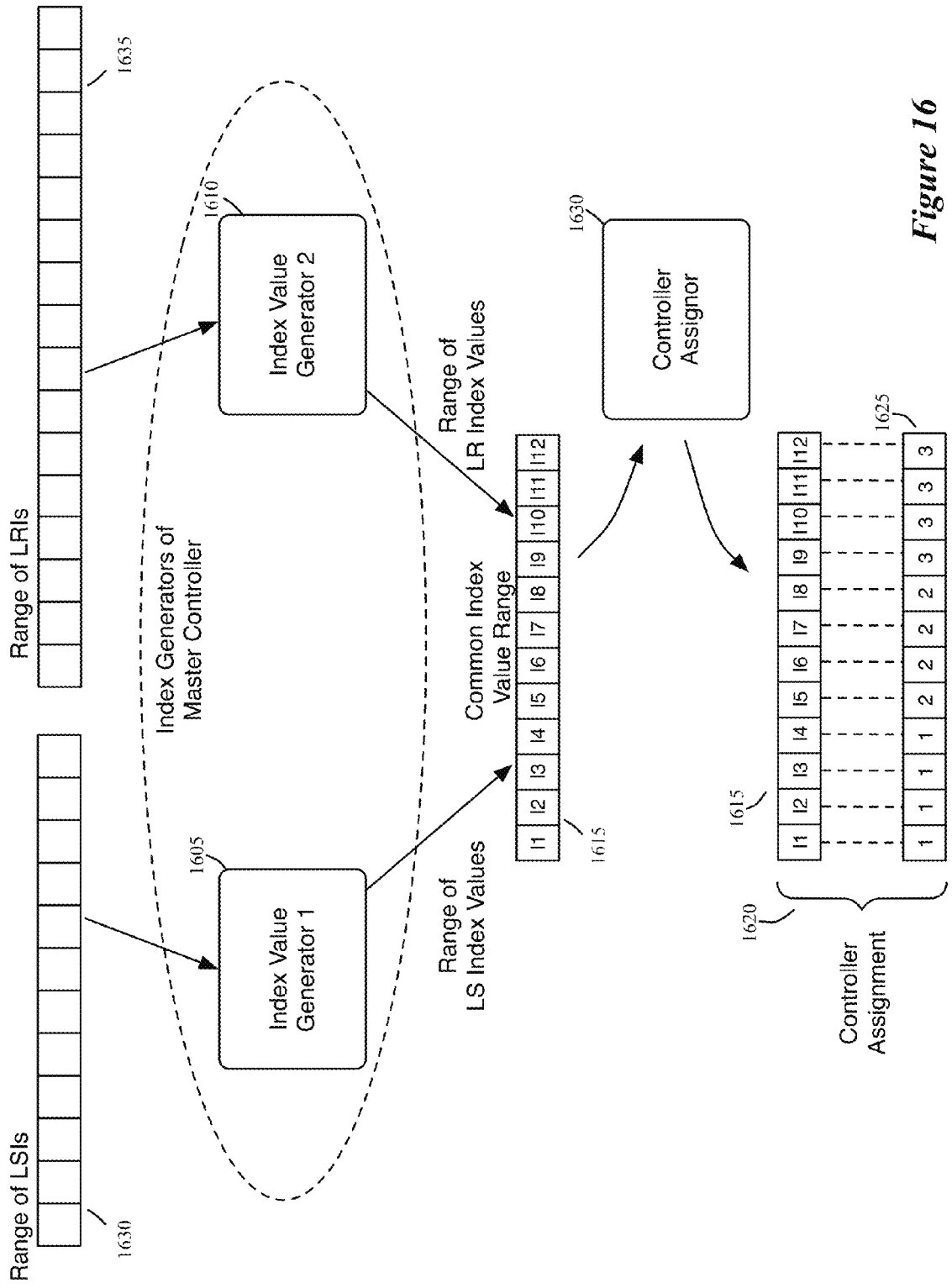
FIG. 16 presents a pictorial illustration of these operations.

In other embodiments, the master controller uses index value generators to generate index values for the different possible LFE identifiers. FIGS. 15 and 16 illustrate the operation of such a master controller. In particular, FIG. 15 illustrates a process 1500 for generating index values and assigning these index values to different controllers, while FIG. 16 presents a pictorial illustration of these operations.

As shown in FIG. 15, the process 1500 initially selects (at 1505) one possible LFE identifier (LFEI). It then uses (at 1510) an index generator that is appropriate for the LFE of the selected LFEI to generate an index value based on the LFEI. FIG. 16 illustrates an example of this operation. Specifically, it illustrates two different index value generators 1605 and 1610 of the master controller mapping two different ranges of identifiers, a LS identifier range 1630 and a LR identifier range 1635, to one range of index values 1615 that is common for the range of the LS and LR identifiers.

After generating the index value for the selected LFE identifier, the process 1500 associates (1515) a controller to the generated index value according to a distribution process that maximizes the even distribution of the generated index values among the controllers. Next, at 1520, the process determines whether it has iterated through all the LFE identifiers. If so, it ends. Otherwise, it returns to 1505 to select another LFEI and to repeat operations 1510, 1515, and 1520.

Once the process finishes iterating through all the possible LFE identifiers, it has built the controller assignment list. FIG. 16 illustrates an example of the completed controller assignment list. Specifically, it illustrates a controller assignment list 1620 that includes the range of index values 1615 and number of controller identifiers 1625 that specify a controller identifier for each specified index value. In some embodiments, the controller assignment list 1620 is produced by a controller assignor 1630 that uniformly distributes the index values (produced by index value generators 1605 and 1610 for the LSIs and the LRIs) across the three controllers 102, 104, and 106.

Figure 17:
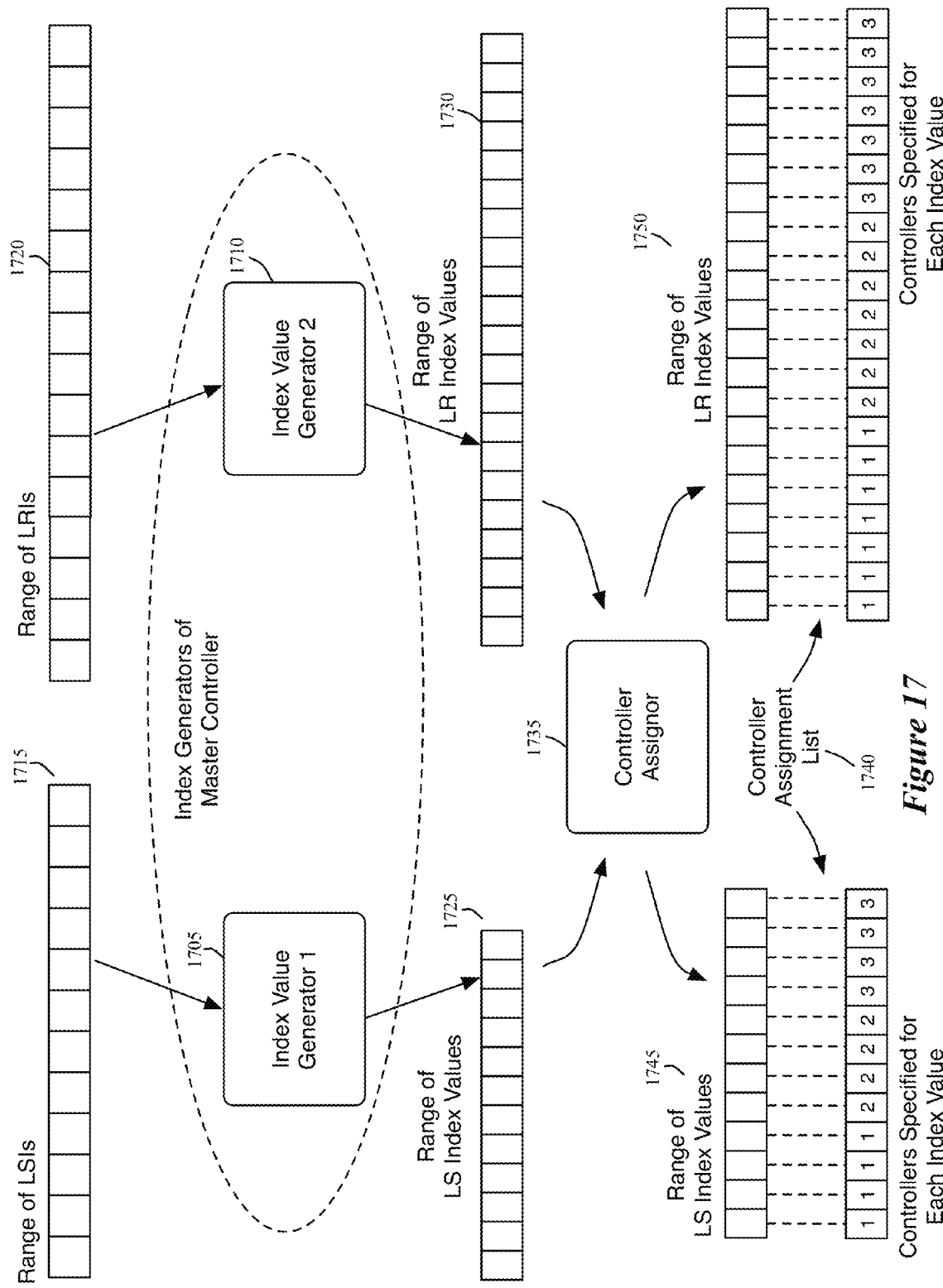
FIG. 17 illustrates a master controller of some embodiments using index generators to map the different logical switch and logical router identifier ranges to different ranges of index values.

In still other embodiments, the master controller uses still other schemes for generating the index values. For instance, unlike the example illustrated in FIG. 16, which maps LS and LR identifiers to a shared range of index values, FIG. 17 illustrates a master controller of some embodiments using index generators 1705 and 1710 to map the different LS and LR identifier ranges 1715 and 1720 to different ranges of index values 1725 and 1730. As shown in this figure, the controller assignor 1735 of the master controller then uses these two different index value ranges to specify a controller assignment list 1740. As shown, this controller assignment list includes one set of records 1745 that map the range of LS index values to the different controllers and another set of records 1750 that map the range of LR index values to these controllers.

The above-described controller assignment processes assign controllers to ranges of index values and distribute loads across the controllers based on statically expressed parameters. For instance, some of the above-described processes distribute the index value range evenly amongst the controllers. However, such static approach might not accurately track the dynamic realities of the network control system. For instance, even when the number of LFE identifiers assigned to a first controller equal the number of LFE identifiers assigned to a second controller, the LFEs assigned to the first controller might impose more burden on the first controller, than the LFEs assigned to the second controller assign to this controller.

Accordingly, the master controller of some embodiments assigns the LFEs to the different controllers based on dynamically gathered data, such as the number of VMs assigned to each controller, the number of packets passing through the LFEs, the number of host-controller connections for each controller, or other dynamically collected data regarding the load on the LFEs and/or controllers.

Figure 18:
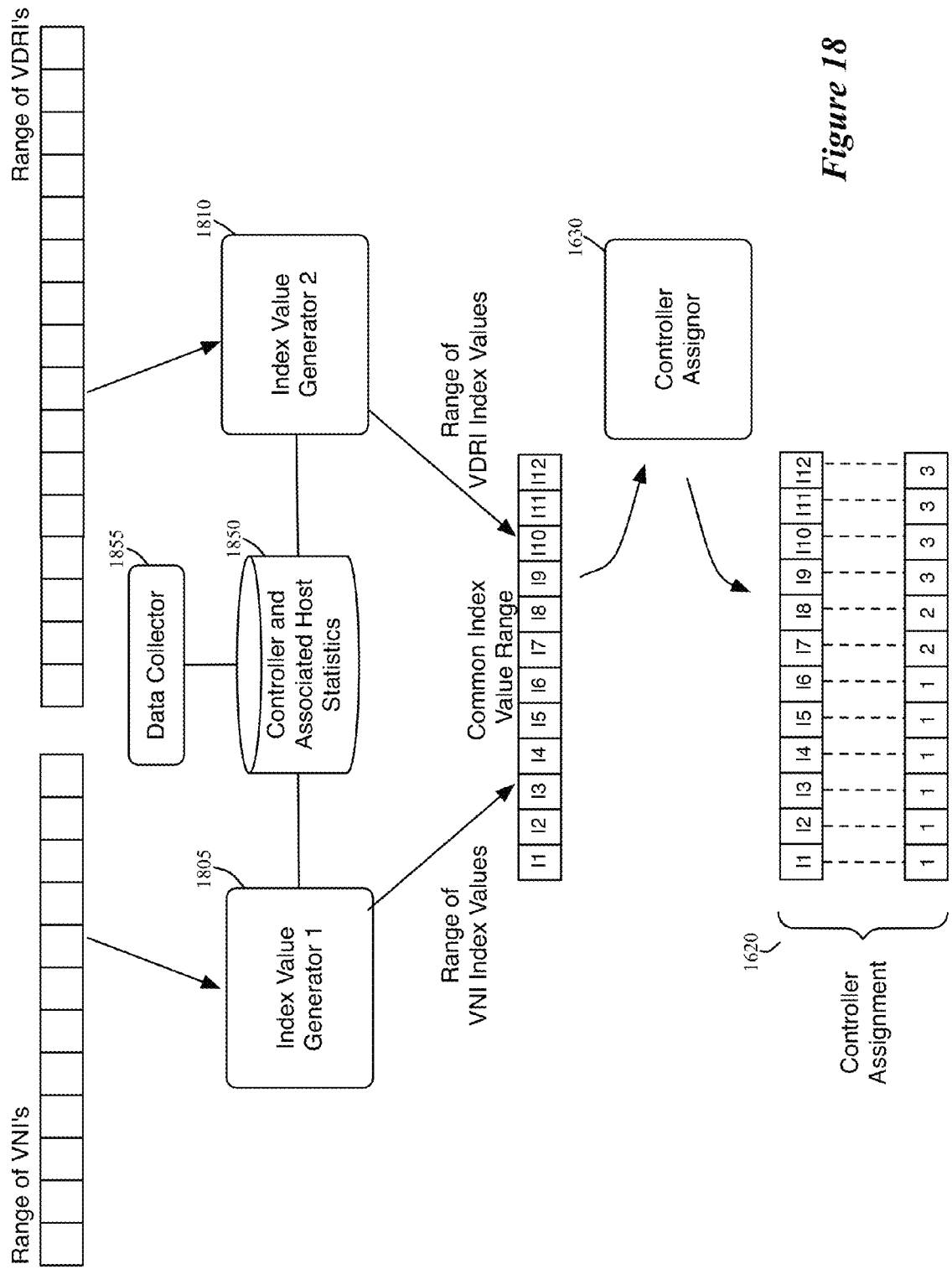
FIGS. 18 and 19 illustrate other approaches for generating index values.
Figure 19:
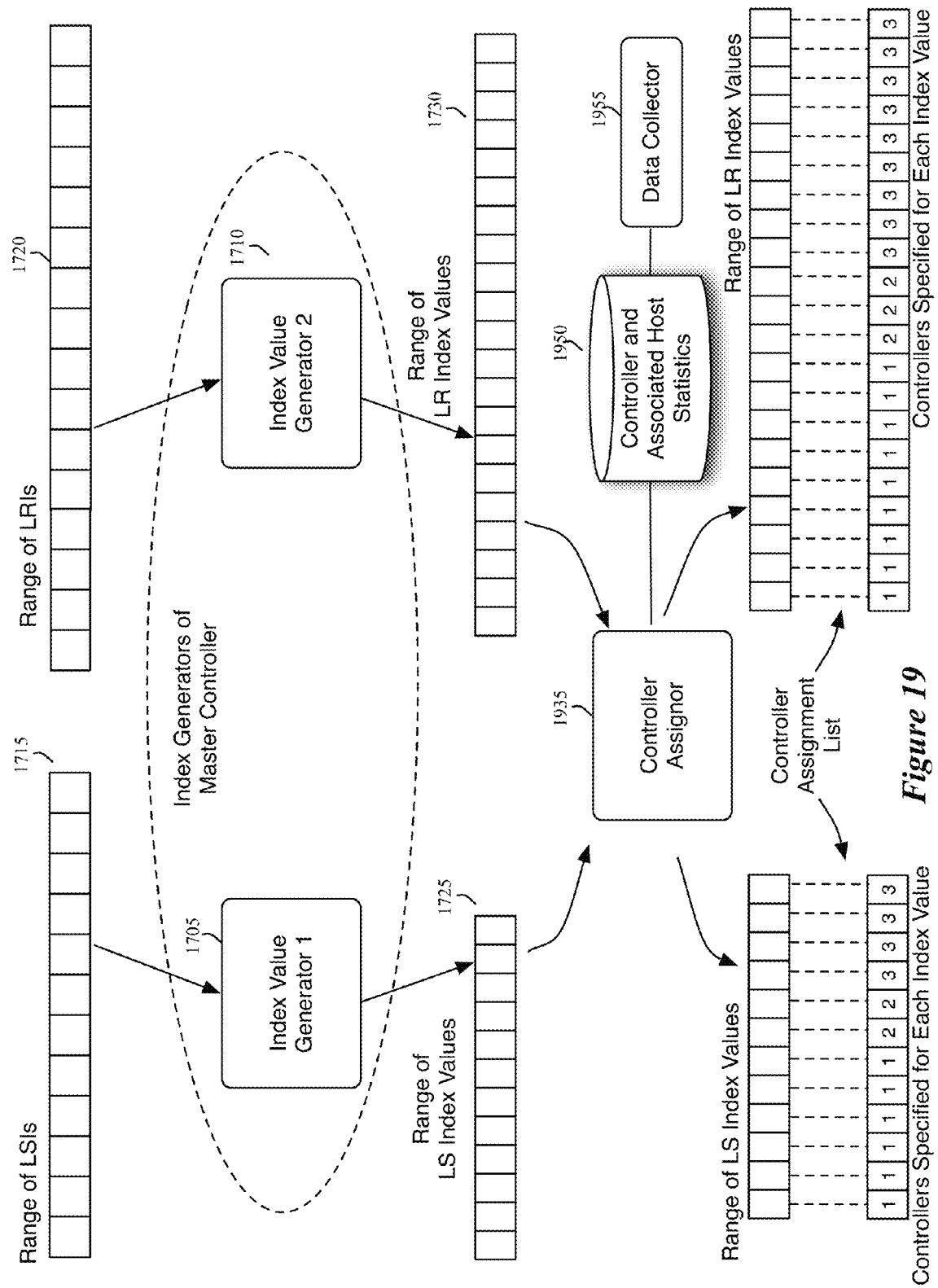

FIGS. 18 and 19 illustrate two examples of how master controllers in two different embodiments generate controller assignment lists from dynamically collected data. Specifically, FIG. 18 illustrates an approach that is similar to the approach described above by reference to FIG. 16, except that the index generators map LS and LR identifiers to a common index value range based on LFE and/or controller load data 1850 that a data collector 1855 of the master controller gathers. Using this approach, more LS and LR identifiers may be assigned to a first index value or index value range than to second index value or index value range, because the index generators determine that fewer LS's and/or LRs should be assigned to a second controller associated with the second index value or index value range than to a first controller associated with the first index value or index value range. The index generators make this determination in some embodiments after determining that the load on the second controller is more than the load on the first controller.

In some embodiments, for each LFE identifier, an index generator computes a traffic weight factor based on the number of hypervisors connected, stats of the traffic (ARP messages, route update messages, etc), the scale of configurations (e.g. how many L2 networks are included in the L3 component), etc. The index generator then generates the hash value as an exponential operation on the "weight" value. This results in the larger weight values being distributed more sparsely in the hash table, which increases the possibility of distributing them to different controller nodes. In some embodiments, the actual weight value falls into a large range, and this makes unlikely that two identifiers have the same weight.

FIG. 19 an approach similar to the approach described above by reference to FIG. 17, except that the controller assignor 1930 assigns the index values of the LFEs and LRs across the three controllers 102, 104, and 106 based on LFE and/or controller load data 1950 that the master controller's data collector 1955 gathers. In this example, this dynamic allocation of data results in more of the index values (i.e., more of the LFEs) being assigned to the first controller, and fewer of the index values (i.e., fewer of the LFEs) being assigned to the second controller, as shown in FIG. 19. This is because in this example, the fewer number of LFEs assigned to the second controller place approximately the same load on the second controller as the larger number of LFEs assigned to the first controller place on this controller.

For the embodiments illustrated by FIG. 19, the host computers include index generators to generate index values for the LFEs that allow the agents to identify the correct record in the controller assignment lists that they receive. However, in other embodiments, the host computers do not have index generators, do not generate index values, and do not even receive controller assignment lists. Rather, in these embodiments, each host's agent contacts the master controller for each of its LFEs in order to identify the controller for the LFE. Once the agent is notified of the controller identity for an LFE, the agent creates a connection with this controller for its LFE, if such a connection was not previously specified, and adds this connection to its connection list, which it then uses to process subsequent requests.

In some of these embodiments, the controller assignor does not need index values to be generated, as it maintains its controller assignment list in terms of the LFE identifiers. Specifically, the controller assignor uses the dynamically collected data 1950 to assign different LFEs, and to adjust dynamically the different LFEs, to the different controllers, and to express these assignments in terms of the LFEIs.

Foregoing index generators in the host computers is advantageous in that it does not require the controller assignment list to be distributed each time that it is modified based on dynamically collected data. On the other hand, in embodiments where the controller assignment list is not frequently updated based on the dynamically collected data, having the hosts generate the index values is preferable as it does not add to the master controller the load associated with the building of each host's connection list.

Figure 20:
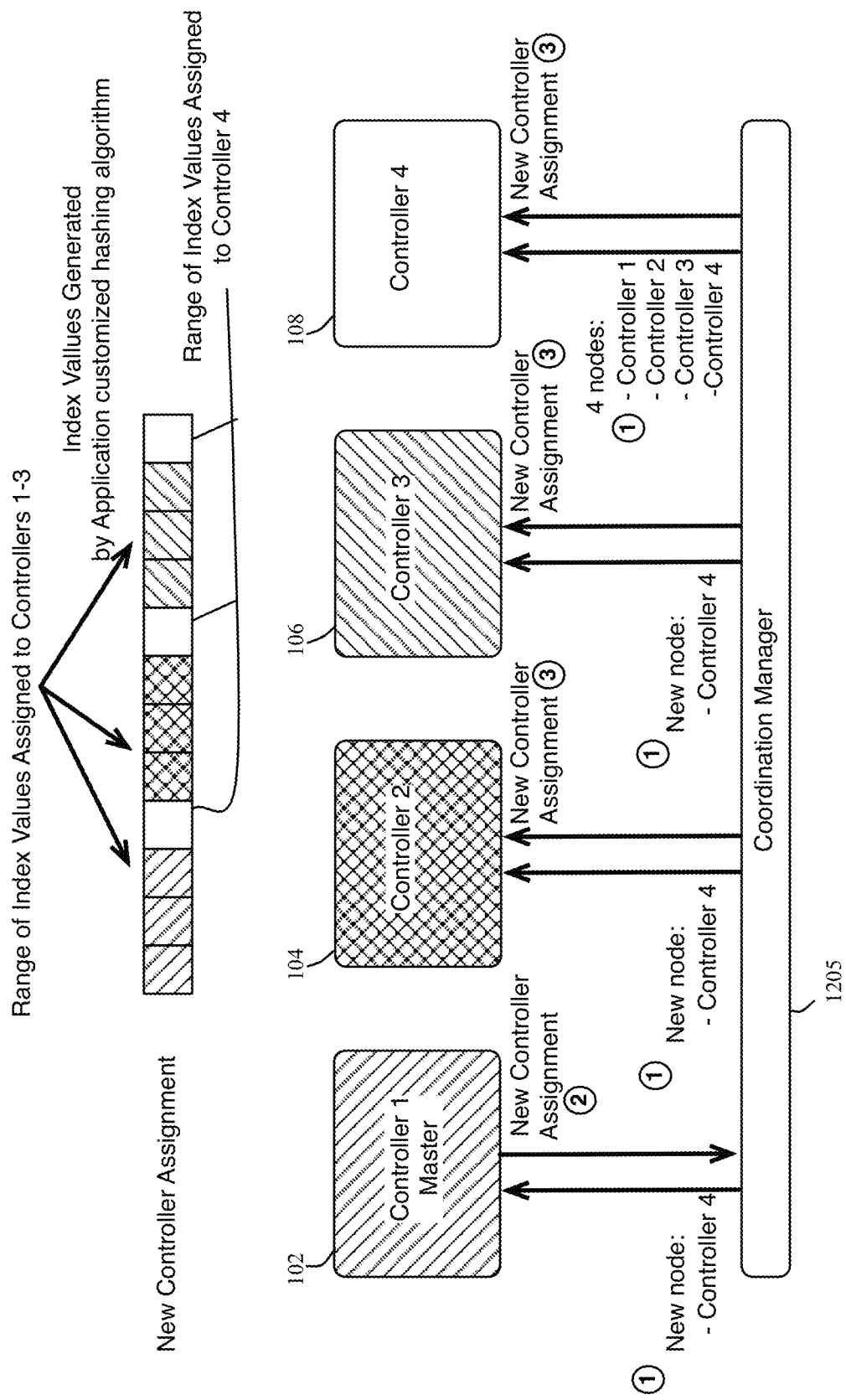
FIG. 20 illustrates the operations of the network control system when a new controller is added to the controller cluster.

FIG. 20 illustrates the operations of the network control system when a new controller is added to the controller cluster. As shown in this figure, the coordination management layer 1205 notifies the currently operating controllers 102, 104, and 106 that a new controller 108 has been added to the controller cluster. The coordination management layer also informs the new controller 108 of the identity of all the current controllers in the cluster.

Upon noting the addition of the new controller, the master controller 102 generates a new controller assignment list, and distributes this new list to the other controllers 104, 106 and 108, as shown in FIG. 20. To minimize the traffic and overhead that would be caused by completely reshuffling the old controller assignments to produce a new controller assignment list, the controller assignor of the master controller generates in some embodiments the new controller assignment list by trying to minimize the changes to any one controllers assignments. For instance, in some embodiments, the controller assignor incrementally modifies each controller's existing assignment so that no one controller's assignment is drastically modified.

To do this, the master controller in some embodiments takes the same fraction of the LFE assignments or index value range assignments (e.g., one over the number of the previous controllers plus the number of added controller(s)) from each previous controller's assigned range and adds this fraction to the assignment of the new controller(s). FIG. 20 illustrates this incremental change by showing that one fourth of the previous assignments of each of the previous controllers 102, 104, and 106 has been assigned to the new controller 108. This leaves each of the previous controllers with three fourths of the previous assignments.

In some embodiments, the master controller also runs a timer, which when expired causes the master controller to check periodically that the controller nodes are well balanced. Whenever it detects that the controllers are not well balanced, the master controller will generate and send a new controller assignment list.

Whenever the master controller sends a controller assignment list update, the hosts will receive their updates from the controllers (including the master controller) to which they subscribed to receive such updates. Also, when such updates re-assign an LFE from one controller to another, the host agents that deal with this LFE have to close their connection to the previous controller and establish a new connection to the new controller, if such a connection is needed.

Figure 21:
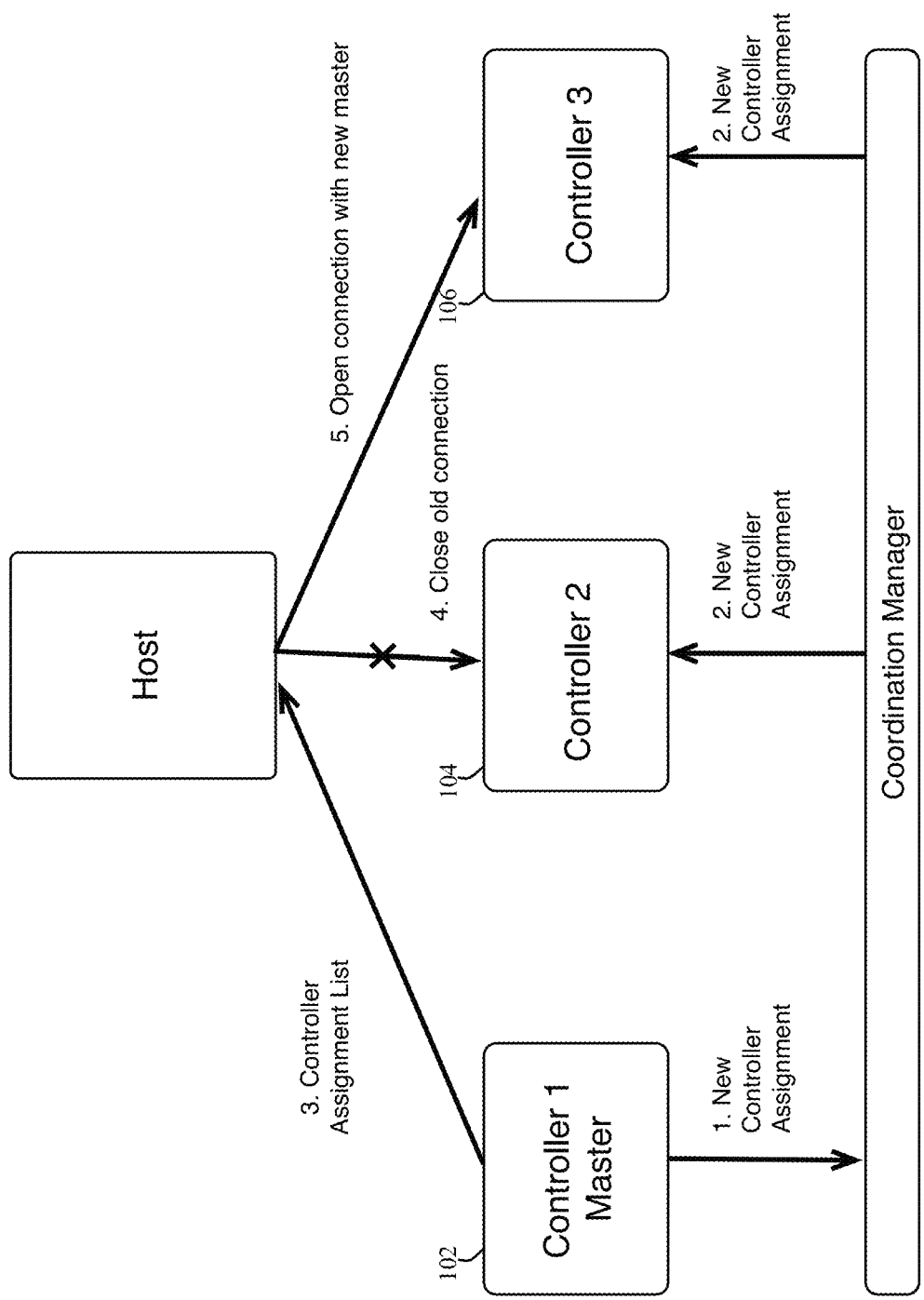
FIG. 21 illustrates an example of a host closing an old, invalid connection to an old controller and opening a new, valid connection to a new controller.

FIG. 21 illustrates an example of a host closing an old, invalid connection to an old controller and opening a new, valid connection to a new controller. Specifically, this figure shows that after the master controller 102 has sent a new controller assignment list to the other controllers 104 and 106, it sends the modified controller assignment list to a host that has subscribed to the master controller to receive such updates. After receiving the new controller list assignment, the host clears all the data from the old connection to the controller 104 for the LS 20, closes its old connection to controller 104 for LS 20, and establishes a new connection to controller 106 for LS 20. While FIG. 21 illustrates the master controller 102 providing the new controller assignment list to the host, one of ordinary skill will realize that in some embodiments any other controller could provide this list to the host so long as that host subscribed to that controller to receive such updated lists.

In some cases, the new controller for an LFE might receive and/or process its new controller assignment list after a host receives and processes this list for the LFE. If that is the case, the new controller and host will have inconsistent states. To handle this case, the controller is configured to reject a connection by a host agent for a particular LFE until the controller's assignment list specifies that it should accept connections for the particular LFE. In such situations, the host agent starts a timer and tries again to establish the connection with the new controller upon the expiration of the timer.

In some embodiments, the master controller may not distribute the controller assignment list in its entirety each time that it updates this list. Rather, each time that it updates a portion of the master controller list, the master controller of some embodiments might only distribute the portion of the controller assignment list that it has updated. Similarly, in some embodiments, each time that each controller sends its subscribed hosts updated controller lists, it might not include the entire list, but only include the records in this list that have been updated.

Figure 22:
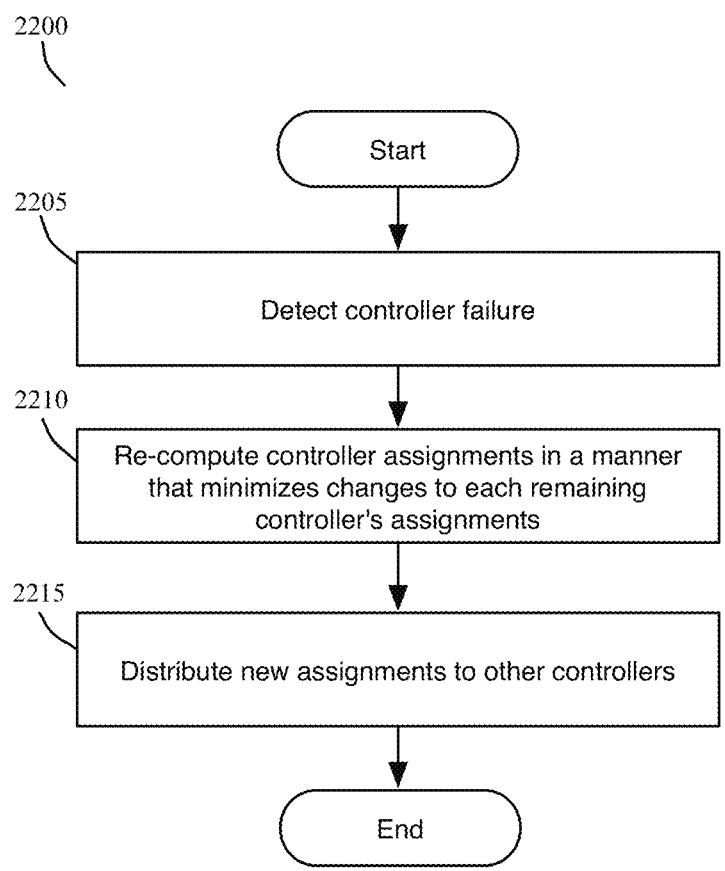
FIG. 22 illustrates a process that the master controller performs when a controller fails.
Figure 23:
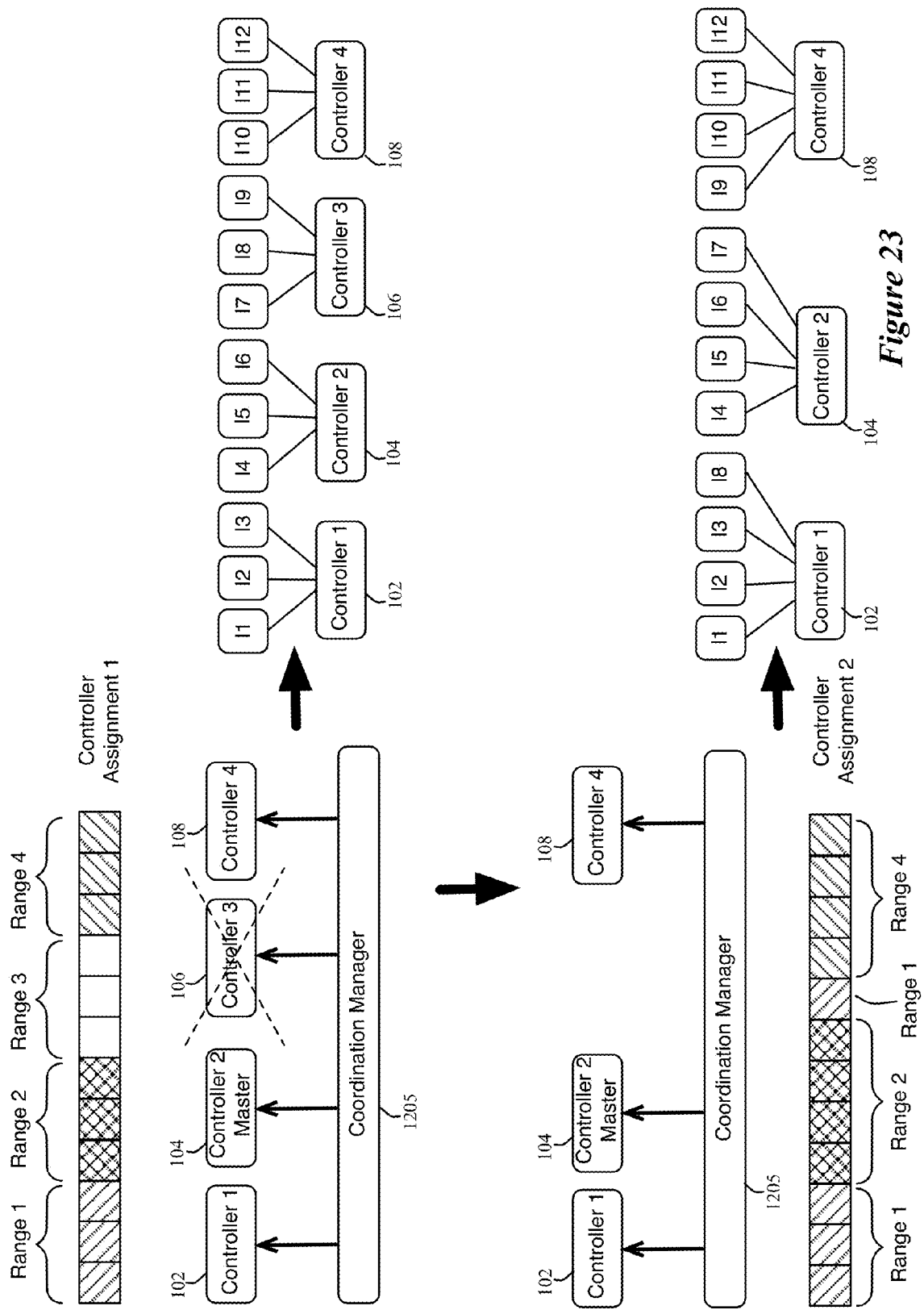
FIG. 23 illustrates an example of one of the controllers of a four controller cluster failing.

When a controller fails, the master controller has to re-specify the controller assignment list. As in the case of the addition of a controller, the master controller of some embodiments re-specifies the controller assignment list in order to minimize the LFE assignments or index value assignments to each of the remaining controllers. FIGS. 22 and 23 illustrate an example of this operation of the master.

FIG. 22 illustrates the process 2200 that the master controller performs when a controller fails. As shown in this figure, the process 2200 initially receives (at 2205) notification from the coordination management layer that one of the non-master controllers has failed. FIG. 23 illustrates an example of one of the controllers (controller 106) of a four controller cluster failing. It also illustrates that before this failure, each controller 102, 104, 106 or 108 had a different range of index values assigned to it. This figure also provides a second pictorial illustration of the index values 11-112 being assigned to the controllers 102, 104, 106, and 108. Each of these index values can represent an LFE, as it can be generated from an LFE identifier.

After 2205, the process 2200 re-specifies (at 2210) the controller assignment list, distributes (at 2215) the newly specified controller assignment list to the other controllers, and then ends. In some embodiments, the process re-specifies (at 2210) the controller assignment list in order to minimize index value assignments to each of the remaining controllers. For instance, in some embodiments, the master's controller assignor incrementally modifies each controller's existing assignment so that no one controller's assignment is drastically increased or modified. To do this, the master controller in some embodiments takes the same fraction of the LFE assignments or index value range assignments (e.g., one over the number of the remaining controllers) from the failed controller's previous assignments and adds this fraction to the assignment of the remaining controllers.

FIG. 23 illustrates this incremental change by showing that each of the remaining controllers 102, 104 and 108 is assigned one third of the previous assignments of the failed controller 106. In this example, the failed controller 106 was assigned index values 17, 18 and 19. After the master re-specifies the new controller assignment, the index 17 is assigned to controller 104, the index 19 is assigned to controller 108, and the index 18 is assigned to controller 102.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
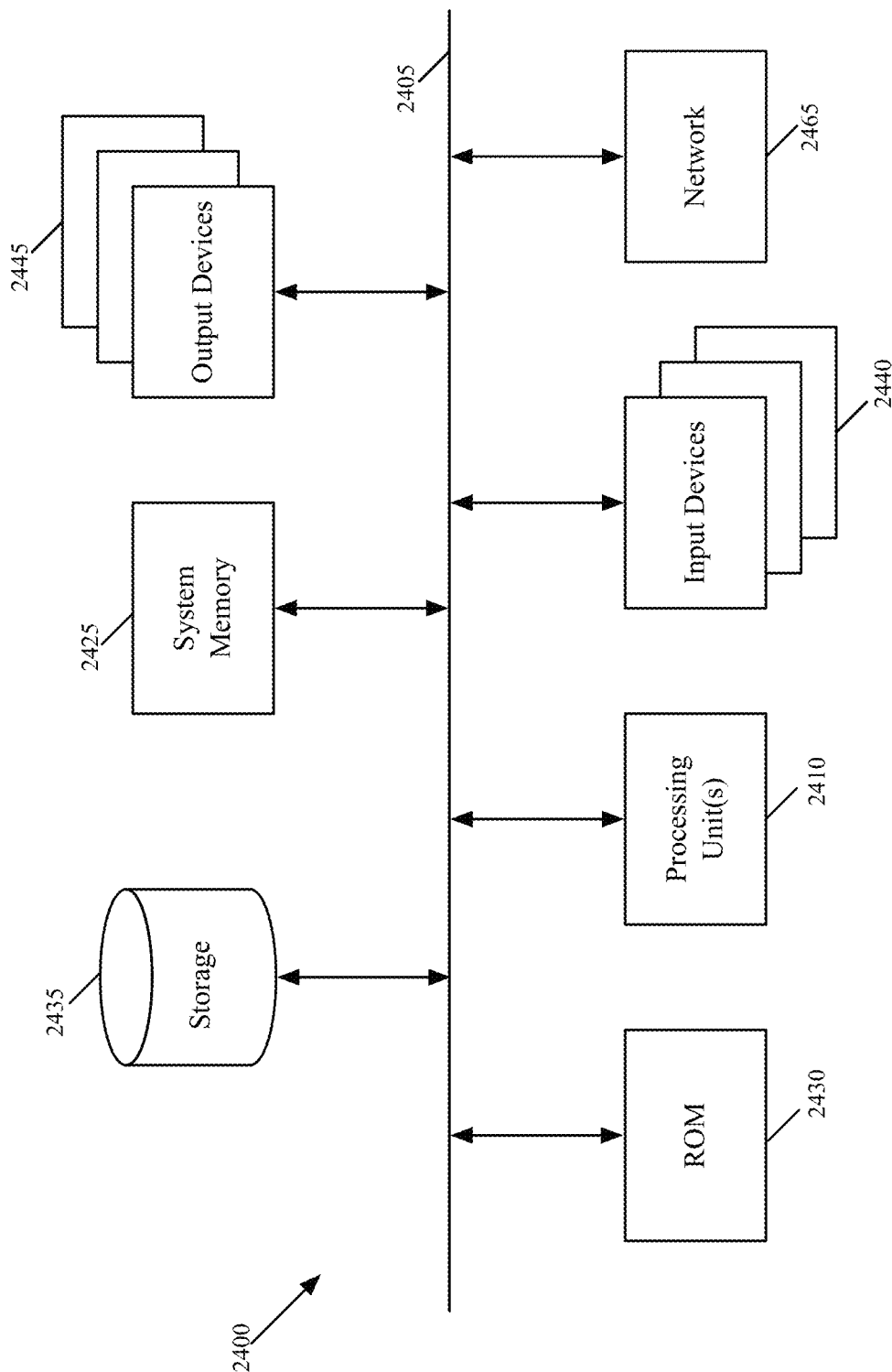
FIG. 24 illustrates a computing device that can be used as a host computer or a controller of some embodiments of the invention.

FIG. 24 conceptually illustrates an electronic system 2400 with which some embodiments of the invention are implemented. The electronic system 2400 can be used to execute any of the control, virtualization, or operating system applications described above. The electronic system 2400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2400 includes a bus 2405, processing unit(s) 2410, a system memory 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the system memory 2425, and the permanent storage device 2435.

From these various memory units, the processing unit(s) 2410 retrieve instructions to execute and data to process in order to execute the processes of the invention. The processing unit(s) may be a single processor or a multi-core processor in different embodiments.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, etc.) as the permanent storage device. Like the permanent storage device 2435, the system memory 2425 is a read-and-write memory device. However, unlike storage device 2435, the system memory is a volatile read-and-write memory, such a random access memory. The system memory stores some of the instructions and data that the processor needs at runtime. In some embodiments, the invention's processes are stored in the system memory 2425, the permanent storage device 2435, and/or the read-only memory 2430. From these various memory units, the processing unit(s) 2410 retrieve instructions to execute and data to process in order to execute the processes of some embodiments.

The bus 2405 also connects to the input and output devices 2440 and 2445. The input devices enable the user to communicate information and select commands to the electronic system. The input devices 2440 include alphanumeric keyboards and pointing devices (also called "cursor control devices"). The output devices 2445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 24, bus 2405 also couples electronic system 2400 to a network 2465 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6, 11, 13, 15, and 22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. For a network control system that includes a plurality of host computers that execute a plurality of physical forwarding elements (PFEs) that collectively implement a plurality of logical forwarding elements (LFEs), a method of managing the LFEs comprising:
   defining a range of index values for different types of LFEs;
   identifying a plurality of controllers to manage the LFEs;
   generating a controller assignment list that associates each controller with at least one index value sub-range that contains at least one index value derivable from the identifier of at least one LFE;
   distributing the controller assignment list to host computers, wherein the host computers use the list to identify which controllers to request data necessary for effectuating a subset of the operations of the LFEs, wherein when first and second index values derived from first and second identifiers of first and second LFEs fall within a particular sub-range of index values, a controller associated with the particular index value sub-range manages both the first and second LFEs.

2. The method of claim 1, wherein the controller assignment list associates different controllers with different sub-ranges of index values within the defined index value range.

3. The method of claim 1, wherein the first and second LFEs have the same type.

4. The method of claim 1, wherein the first and second LFEs are different type LFEs.

5. The method of claim 4, wherein the first LFE is a logical switch, while the second LFE is a logical router.

6. The method of claim 1, wherein the controller assignment list associates each controller with more than one index value.

7. The method of claim 1, wherein when a particular index value is derivable from first and second identifiers of first and second LFEs of the same type, a controller that is associated with the particular index value manages both the first and second LFEs.

8. The method of claim 1, wherein when a particular index value is derivable from first and second identifiers of first and second LFEs of different types, a controller that is associated with the particular index value manages the first and second LFEs.

9. The method of claim 1, wherein the index values are derivable from the LFE identifiers by using a hash operation that comprises a modulo operation.

10. For a network control system that includes a plurality of host computers that execute a plurality of physical forwarding elements (PFEs) that collectively implement a plurality of logical forwarding elements (LFEs), a method of managing the LFEs comprising:
   identifying a plurality of controllers to manage the LFEs;
   generating a controller assignment list that associates different controllers with different index value ranges, at least one index value range containing at least one index value that is derivable from the identifier of at least one LFE, said generating comprising assigning the index values to the controllers by using a load-balancing process for distributing the LFE management load across the controllers;
   distributing the controller assignment list to the host computers, wherein the host computers use the list to identify which controllers to contact to request data necessary for effectuating a subset of the LFE operations, wherein when first and second index values derived from first and second identifiers of first and second LFEs fall within a particular range of index values, a controller associated with the particular index value range manages both the first and second LFEs.

11. The method of claim 10, wherein the load-balancing process distributes the responsibility for the LFEs based on a set of criteria that includes assigning the same number of LFEs to each controller.

12. The method of claim 10, wherein the load-balancing process distributes the responsibility for the LFEs based on a set of criteria that includes assigning the same number of LFEs of the same type to each controller.

13. The method of claim 10 further comprising:
   detecting that one of the controllers has failed; and
   distributing the LFEs assigned to the failed controller to the remaining controllers by distributing the index value range assigned to the failed controller to the remaining controllers.

14. The method of claim 13, wherein distributing the index values comprises using the load-balancing process to distribute the index value range that was previously assigned to the failed controller to the remaining controllers.

15. The method of claim 10 further comprising:
   detecting that a new controller has been added; and
   assigning a subset of LFEs that were previously assigned to other controllers to the new controller by re-assigning a subset of index values that were previously assigned to the other controllers to the new controller.

16. The method of claim 15, wherein distributing the index values comprises using the load-balancing process to distribute an equal-sized portion of index values that were previously assigned to each of the other controllers to the new controller.

17. The method of claim 10, wherein distributing the controller assignment list comprises directly sending the controller assignment list to the host computers.

18. The method of claim 10, wherein distributing the controller assignment list comprises sending the controller assignment list to the other controllers, wherein each controller provides the controller assignment list to a different set of host computers.

19. The method of claim 10, wherein the identifying, generating and distributing operations are performed by one controller that is designated as a master controller for generating the controller assignment list.

20. The method of claim 10,
   wherein the range of index values corresponds to a range of remainder values for a modulo operation of a hash operation, wherein the hash operation is used by the host computers to generate the index values from the LFE identifiers.

* * * * *